United States Patent
Yamamoto et al.

(10) Patent No.: US 11,386,282 B2
(45) Date of Patent: Jul. 12, 2022

(54) OPTICAL INFORMATION READER

(71) Applicant: DENSO WAVE INCORPORATED, Aichi-pref. (JP)

(72) Inventors: Kenryo Yamamoto, Chita-gun (JP); Koji Konosu, Chita-gun (JP); Makoto Ito, Chita-gun (JP); Kentaro Sasaki, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 17/419,225

(22) PCT Filed: Dec. 25, 2019

(86) PCT No.: PCT/JP2019/051007
§ 371 (c)(1),
(2) Date: Jun. 28, 2021

(87) PCT Pub. No.: WO2020/138234
PCT Pub. Date: Jul. 2, 2020

(65) Prior Publication Data
US 2022/0058356 A1    Feb. 24, 2022

(30) Foreign Application Priority Data

Dec. 26, 2018  (JP) .............................. JP2018-242074
May 31, 2019   (JP) .............................. JP2019-102836
Dec. 20, 2019  (JP) .............................. JP2019-229893

(51) Int. Cl.
  *G06K 7/14*    (2006.01)
  *G06K 7/10*    (2006.01)
  *G02F 1/1337*  (2006.01)

(52) U.S. Cl.
  CPC ......... *G06K 7/1417* (2013.01); *G02F 1/1337* (2013.01); *G06K 7/10732* (2013.01)

(58) Field of Classification Search
  CPC .............. G06K 7/1404; G06K 7/1417; G06K 7/10732; G02F 1/1337
  See application file for complete search history.

(56) References Cited

U.S. PATENT DOCUMENTS

2016/0034734 A1    2/2016  Nagata et al.
2018/0239937 A1*   8/2018  Nagata ................. G06K 7/1417
2020/0202089 A1*   6/2020  Suman ............... G06K 7/10732

* cited by examiner

*Primary Examiner* — Laura A Gudorf
(74) *Attorney, Agent, or Firm* — Oliff PLC

(57) ABSTRACT

In an optical information reader which optically reads an information code, a first polarizing unit arranged on the light-exit side of a lighting unit is configured to polarize illumination light therefrom in a predetermined polarization direction. In addition, a second polarizing unit arranged on the light-reception side of a light receiving sensor is configured as a switchable polarization unit, in which the switchable polarization unit is capable of performing a switchover between a polarized state in which light reflected from the information code is polarized in a direction different from the predetermined polarization direction and a passing state where the reflected light passes therethrough without being polarized.

20 Claims, 19 Drawing Sheets

READING SUCCESS RATE (%)

|  |  | SWITCHED STATE | |
|---|---|---|---|
|  |  | POLARIZED STATE | PASSING STATE |
| EXPOSURE CONDITION | A | 90 | 0 |
|  | B | 10 | 90 |
|  | C | 10 | 30 |
|  | D | 0 | 0 |

(B)

SWITCHING FREQUENCY

|  |  | SWITCHED STATE | |
|---|---|---|---|
|  |  | POLARIZED STATE | PASSING STATE |
| EXPOSURE CONDITION | A | 1 | 0 |
|  | B | 0 | 1 |
|  | C | 0 | 0 |
|  | D | 0 | 0 |

(C)

READING CONDITION TABLE

|  | No.1 | No.2 |
|---|---|---|
| SWITCHED STATE | POLARIZED STATE | PASSING STATE |
| EXPOSURE CONDITION | A | B |

READING SUCCESS RATE (%)

| | | SWITCHED STATE | |
|---|---|---|---|
| | | POLARIZED STATE | PASSING STATE |
| EXPOSURE CONDITION | A | 10 | 50 |
| | B | 10 | 60 |
| | C | 90 | 0 |
| | D | 0 | 0 |

(B)

SWITCHING FREQUENCY

| | | SWITCHED STATE | |
|---|---|---|---|
| | | POLARIZED STATE | PASSING STATE |
| EXPOSURE CONDITION | A | 0 | 0 |
| | B | 0 | 2 |
| | C | 3 | 0 |
| | D | 0 | 0 |

(C)

READING CONDITION TABLE

| | No.1 | No.2 | No.3 | No.4 | No.5 |
|---|---|---|---|---|---|
| SWITCHED STATE | POLARIZED STATE | POLARIZED STATE | POLARIZED STATE | PASSING STATE | PASSING STATE |
| EXPOSURE CONDITION | C | C | C | B | B |

FIG.17
(A)
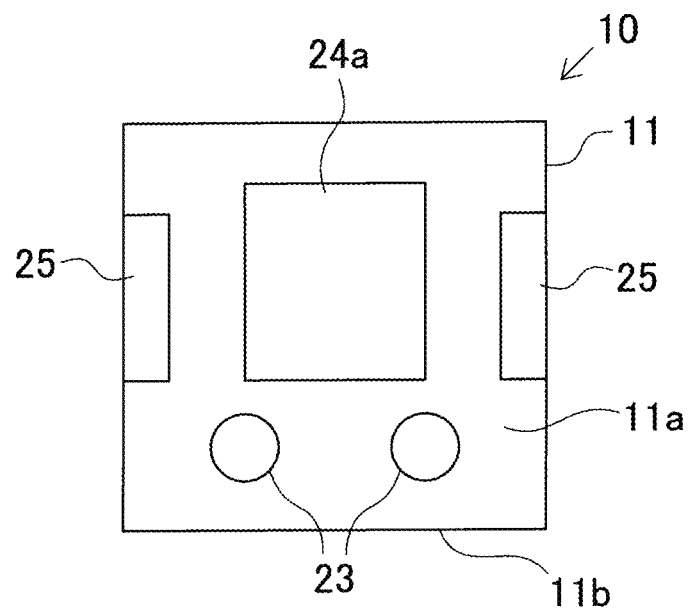
(B)
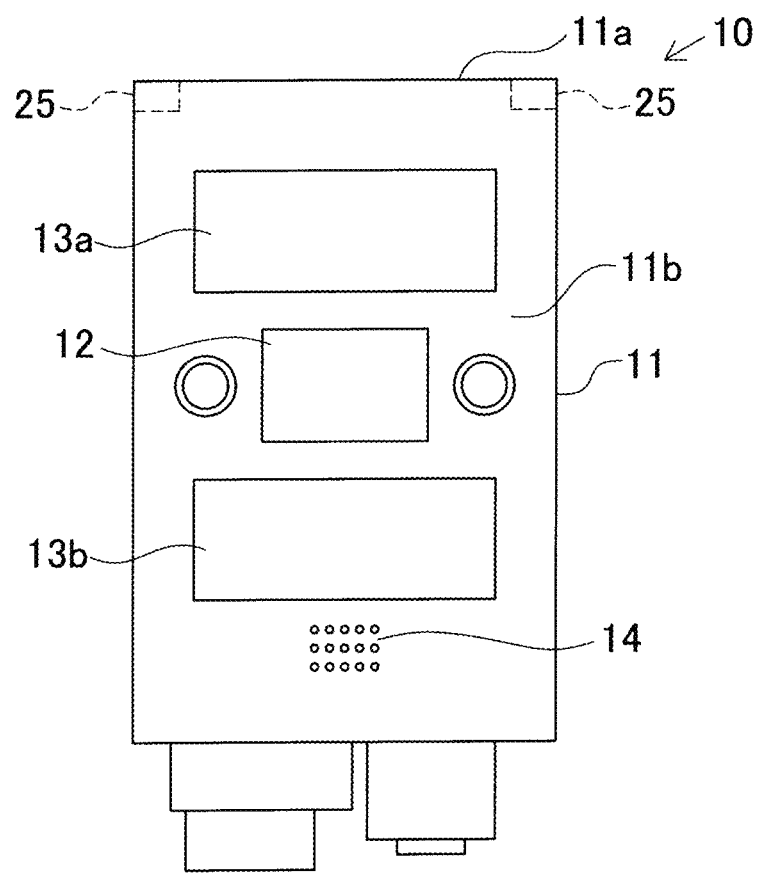

ial information reader, and more particularly to an optical information reader that reads information stored in an information medium, such as an information code, based on light reflected from the information medium.

OPTICAL INFORMATION READER

CROSS-REFERENCE TO RELATED APPLICATION

This application is based on and claims the benefit of priority from earlier Japanese Patent Applications No. 2018-242074 filed on Dec. 26, 2018 and No. 2019-102836 filed on May 31, 2019 the descriptions of which are incorporated herein by reference.

BACKGROUND

Technical Field

The present disclosure relates to an optical information reader, and more particularly to an optical information reader that reads information stored in an information medium, such as an information code, based on light reflected from the information medium.

Related Art

In recent years, an optical reader that reads the information code by receiving the reflected light from the information code in the light receiving unit while the illumination light is emitted from the illumination unit is widely used.

Conventionally, in this type of optical reading device, a polarizing filter is adopted in order to suppress the influence of specular reflection on the display surface on which the information code is displayed during the optical reading. Since the light due to specular reflection retains the polarized light at the time of reflection, the influence of specular reflection can be suppressed by making the polarization direction of the polarizing filter located on the light-exit side of the illumination unit different from the polarization direction of the polarization filter located on the light-reception side of the light receiving unit by 90°. On the other hand, since there are fine irregularities on the surface of castings, etc., the whole surface causes specular reflection. Therefore, with the information code (for example, the information code formed by direct marking on the casting surface) formed on such an uneven surface, a decodable image can be obtained by creating contrast to the code region that does not cause specular reflection. Then, when reading the information code formed on the uneven surface as described above, there is a problem that the contrast to the code region is lost and a decodable image cannot be obtained if light passes through the two polarizing filters configured as described above.

Regarding such a problem, as a technique for realizing an irradiation state of illumination light suitable for reading an information code, for example, an optical information reader disclosed in Patent Document 1 below is known. In this optical information reader, windows are arranged in the emission directions of the four light emitting elements, a polarizing filter is provided in the portion of the window where the light of the two light emitting elements is emitted, and a polarizing filter is not provided in the portion where the light from the remaining two light emitting elements is emitted. Further, in a partial portion of the window portion where light is incident on the optical system of the image pickup device, a polarizing filter having a polarization direction different from that of the above-mentioned polarizing filter by 90° is provided. With such a configuration, when reading an information code or the like that should suppress the influence of specular reflection, both light emitting elements provided with a polarizing filter in the emission direction are made to emit light, and when reading an information code or the like formed on an uneven surface, both light emitting elements not provided with a polarizing filter are made to emit light in the emission direction to switch to an irradiation state suitable for reading the information code.

CITATION LIST

Patent Literature

[PTL 1] JP 2016-033787 A

By the way, in the configuration as described in Patent Document 1, it is necessary to prepare two types of illumination units, that is, an illumination unit (light emitting element) provided with a polarizing filter and an illumination unit not provided with a polarizing filter. Therefore, when reading the information code, since only one of the two types of lighting units can be used, each lighting unit is enlarged in order to secure the amount of illumination light (illuminance) required for reading the information code. Then, there arises a problem that the miniaturization of the optical system, that is, the miniaturization of the optical information reader, becomes difficult.

SUMMARY

Hence, it is desired to provide a configuration capable of switching to a polarized state suitable for reading an information code without adopting a plurality of types of lighting units.

In order to achieve the above object, the optical information reader according to a first main aspect includes an illumination unit that emits illumination light toward the information code, and a first polarizing unit arranged on the light-exit side of the lighting unit, and a light receiving unit that receives the reflected light from the information code, and a second polarizing unit arranged on the light-reception side of the light receiving unit, and a reading unit that reads the information code according to the light receiving result of the light receiving unit. The first polarizing unit is configured so that the illumination light is polarized in a predetermined polarization direction, and the second polarizing unit is configured as a switching polarizing unit that can switch between a state in which the reflected light is polarized in a direction different from the predetermined polarization direction and a state in which the reflected light passes without being polarized.

The optical information reader according to a second main aspect includes an illumination unit that emits illumination light toward the information code, a first polarizing unit arranged on the light-exit side of the lighting unit, a light receiving unit that receives the reflected light from the information code, a second polarizing unit arranged on the light-reception side of the light receiving unit, and a reading unit that reads the information code according to the light receiving result of the light receiving unit. The first polarizing unit is configured as a switching polarizing unit that can switch between a state in which the illumination light is polarized in the first polarization direction and a state in which the illumination light is polarized in the second polarization direction. The second polarizing unit is characterized in that the reflected light is polarized in the second polarization direction. The reference numerals in the parentheses indicate the correspondence with the specific means described in the embodiments described later.

Advantageous Effects

In the first main aspect, the first polarizing unit arranged on the light-exit side of the illumination unit is configured so that the illumination light is polarized in a predetermined polarization direction. The second polarizing unit arranged on the light-reception side of the light receiving unit is configured as a switching polarizing unit that can switch between a state in which the reflected light from the information code is polarized in a direction different from the predetermined polarization direction (hereinafter, also referred to as a polarized state) and the state in which the reflected light passes without being polarized (hereinafter, also referred to as a passing state (i.e., unpolarized state).

As a result, by switching the switching polarizing section to the polarized state, the polarization direction of the first polarizing section and the polarization direction of the second polarizing section can be different. Therefore, when receiving the reflected light from the information code, it is possible to suppress the influence of specular reflection caused by the illumination light from the illumination unit. On the other hand, by switching the switching polarizing unit to the passing state, polarization is not performed in the second polarizing unit, so that the contrast to the code region is not lost even when reading the information code formed on the uneven surface. Therefore, it is possible to switch to a polarized state suitable for reading an information code without adopting a plurality of types of lighting units.

In the second main aspect, the first polarization unit includes a diffusion unit that diffuses the illumination light, and a reflection polarization unit that transmits the light diffused in the diffusion unit in the predetermined polarization direction and reflects the rest toward the diffusion unit. As a result, when the light reflected by the reflection polarizing unit is diffused again by the diffusing member, a part of the light in the predetermined polarization direction is transmitted through the reflection polarizing unit. Since the decrease in the amount of light due to polarization in the first polarizing unit is suppressed, the amount of illumination light required for reading the information code can be easily secured.

Preferably, the light receiving unit includes a light receiving sensor and an imaging lens for forming an image on the light receiving surface of the light receiving sensor. The imaging lens is formed so that the maximum angle of the incident light rays imaged on the light receiving sensor is larger than the maximum angle of the emitted light rays imaged on the light receiving sensor, and the second polarizing unit is arranged between the imaging lens and the light receiving sensor.

In order to widen the imaging range, it is possible to adopt an imaging lens, that is, a wide-angle lens, in which the maximum angle of the incident light rays imaged on the light receiving sensor is larger than the maximum angle of the emitted rays imaged on the light receiving sensor. In this case, if the second polarizing unit that functions as the switching polarizing unit is arranged on the incident side of the imaging lens, the angle of the light beam incident on the switching polarizing unit becomes large. Therefore, for example, when a liquid crystal member or the like is used as the switching polarizing unit, the specular reflection reduction effect of the peripheral portion in the imaging range is weakened. Therefore, by arranging the second polarizing unit (switching polarizing unit) between the imaging lens (wide-angle lens) and the light receiving sensor, the angle of the light beam incident on the switching polarizing unit is smaller than that in the case where the second polarizing unit (switching polarizing unit) is arranged on the incident side of the imaging lens. As a result, even when a wide-angle lens for widening the angle of view is used as the imaging lens, the specular reflection reduction (cut) effect can be obtained over the entire imaging range.

Preferably, the first polarizing unit arranged on the light-exit side of the illumination unit is configured as a switching polarization unit that can switch between a state in which the illumination light is polarized in the first polarization direction (hereinafter, also referred to as a first polarization state) and a state in which the illumination light is polarized in the second polarization direction (hereinafter, also referred to as a second polarization state). The second polarizing unit arranged on the light-reception side of the light receiving unit is configured so that the reflected light from the information code is polarized in the second polarization direction.

As a result, by switching the switching polarization unit to the first polarization state, since the polarization direction of the first polarizing unit and the polarization direction of the second polarizing unit are different, it is possible to suppress the influence of specular reflection caused by the illumination light from the illumination unit when receiving the reflected light from the information code. On the other hand, by switching the switching polarization unit to the second polarization state, the polarization direction of the first polarization section and the polarization direction of the second polarization section are the same. Therefore, the reflected light that has already been polarized is no longer polarized by the second polarizing unit, and even when the information code or the like formed on the uneven surface is read, the contrast to the code region is not lost. Therefore, it is possible to switch to a polarized state suitable for reading an information code without adopting a plurality of types of lighting units. Consequently, it is possible to switch to a polarized state suitable for reading an information code without adopting a plurality of types of lighting units.

Still preferably, the switching polarizing unit is composed of a liquid crystal member and a polarizing plate. The liquid crystal member has a function of switching the incident light between a state in which the incident light is emitted so that the polarization direction changes, for example, 90°, and a state in which the incident light is emitted as it is without changing the polarization direction. Therefore, by combining a liquid crystal member and a polarizing plate that are configured to remove one polarizing plate from a normal TN type liquid crystal, it is possible to inexpensively realize a configuration in which the polarization direction can be switched as the switching polarizing unit.

It is preferred that the liquid crystal member includes a liquid crystal layer and a pair of alignment films facing each other via the liquid crystal layer and having rubbing directions different from each other by 90°, and the alignment film is formed so that the rubbing direction is inclined with respect to one side of the outer edge of the light receiving surface of the light receiving unit.

Normally, the alignment film formed in a rectangular shape is formed so that the rubbing direction is parallel (orthogonal) to one side of the outer edge of the alignment film, and it is known that when two such alignment films are used to receive polarized light, the contrast at the end portion in a direction inclined by about 45° with respect to the rubbing direction becomes low. Therefore, when the liquid crystal member having the alignment film is arranged so that the outer edge of the alignment film and the outer edge of the light receiving surface are parallel to the light receiving unit in which the light receiving surface is formed in a rectangular shape, of the rectangular light receiving range, the vicinity of the corner, which is inclined by about 45° with respect to the rubbing direction, becomes a low contrast range, which may lead to a decrease in the reading success rate.

Therefore, by arranging the alignment film so that the rubbing direction is tilted with respect to one side of the outer edge of the light receiving surface of the light receiving unit, the range in which the contrast becomes low can be changed from the direction tilted by about 45° to a different direction. Because of this, the range in which the contrast becomes low tends to deviate from the rectangular light receiving range, and the decrease in the reading success rate due to the decrease in contrast can be suppressed.

It is also preferred that the liquid crystal member includes a liquid crystal layer containing a spacer, and the liquid crystal layer is formed so that a content rate of the spacer in the region of the light receiving unit that is the light receiving range is lower than a content rate of the spacer in the region that is different from the light receiving range. As a result, even when the liquid crystal member and the light receiving unit are arranged so as to be close to each other on the optical axis, it becomes difficult for the spacer to be imaged, and the deterioration of the quality of the captured image due to the spacer in the liquid crystal layer is suppressed.

An exemplary example includes a control unit for controlling switching operations of the switching polarizing unit and a detecting unit for detecting the completion of switching in the switching polarizing unit, and the light receiving unit starts exposure after the switching in the switching polarizing unit is completed according to the detection result by the detection unit. As a result, since the exposure by the light receiving unit is started after the switching at the switching polarizing unit is surely completed, the image during switching at the switching polarizing unit is not captured, so that an image suitable for reading is captured.

Another exemplary embodiment includes a storage unit for sequentially storing captured images captured from the light receiving unit, and each time the captured image is stored in the storage unit, the reading unit performs a decoding process for decoding and reading the information code for the captured image. As a result, even during switching in the switching polarizing unit, decoding processing can be performed on the captured image that has already been captured, and the processing efficiency can be improved as compared with the case where the decoding process is started after the switching in the switching polarizing unit is completed.

In an exemplary embodiment, since the control unit performs a switchover in the switching polarizing unit according to a predetermined switching frequency, the information code can be smoothly read even when an information code or the like for suppressing the influence of specular reflection or an information code formed on an uneven surface are mixed with a reading target.

Still preferably, the switching frequency in the switching polarizing unit is set by the setting unit according to the comparison result between the decoded result of the reading unit for the captured image captured from the light receiving unit in one state (polarized state, first polarized state) switched by the switching polarizing unit and the decoded result of the reading unit for the captured image captured from the light receiving unit in the other state (passing state, second polarization state) switched by the switching polarizing unit. The control unit performs switching in the switching polarization unit according to the set switching frequency. As a result, even when an information code or the like for suppressing the influence of specular reflection or an information code formed on an uneven surface are mixed with a reading target, the switching frequency can be set according to the mixing situation. Therefore, the reading of the information code can be performed more easily, and the time related to the reading process can be shortened.

Preferably, according to a comparison result between the decoded result of the reading unit obtained each time the exposure condition is changed to one of the states (polarized state, first polarized state) switched by the switching polarizing unit and the decoded result of the reading unit obtained each time the exposure condition is changed to the other state (passing state, second polarization state) switched by the switching polarizing unit, the switching frequency and the exposure condition in the switching polarizing unit are set by the setting unit. As a result, the switching frequency can be set in consideration of the exposure conditions, so that the reading of the information code becomes more successful, and the time related to the reading process can be further shortened.

Preferably, the illumination unit includes a light source that emits illumination light and a condensing element that condenses the illumination light from the light source, and the first polarizing unit is arranged between the light source and the condensing element. The farther away from the light source, the wider the illumination light, so the area where the illumination light is incident on the first polarizing unit, that is, the area where the illumination light should be polarized at the first polarizing unit is smaller than the case where the first polarizing unit is arranged on the light-exit side of the light collecting element, and the size of the first polarizing unit can be reduced.

BRIEF DESCRIPTION OF THE DRAWINGS

In the accompanying drawings:

FIG. 12 has parts (A), (B) and (C), in which the part (A) is an explanatory diagram showing the reading success rate for each switching state and each exposure condition, the part (B) is an explanatory diagram showing the switching frequency obtained from the part (A), and the part (C) is an explanatory diagram illustrating a reading condition table set based on the part (B) and the like.

FIG. 13 has parts (A), (B) and (C), in which the part (A) is an explanatory diagram showing a reading success rate for each switching state and each exposure condition as conditions different from those in the part (A), the part (B) is an explanatory diagram showing the switching frequency obtained from the part (A), and the part (C) is an explanatory diagram illustrating a reading condition table set based on the part (B) and the like.

FIG. 17 has parts (A) and (B) and shows is an explanatory view showing the appearance of the optical information reader according to the eighth embodiment, in which part (A) thereof shows a state seen from the first surface of the case and part (B) thereof shows a state seen from the second surface of the case.

DESCRIPTION OF THE EMBODIMENTS

First Embodiment

Hereinafter, the first embodiment embodying the present disclosure will be described with reference to the drawings.

Figure 1:
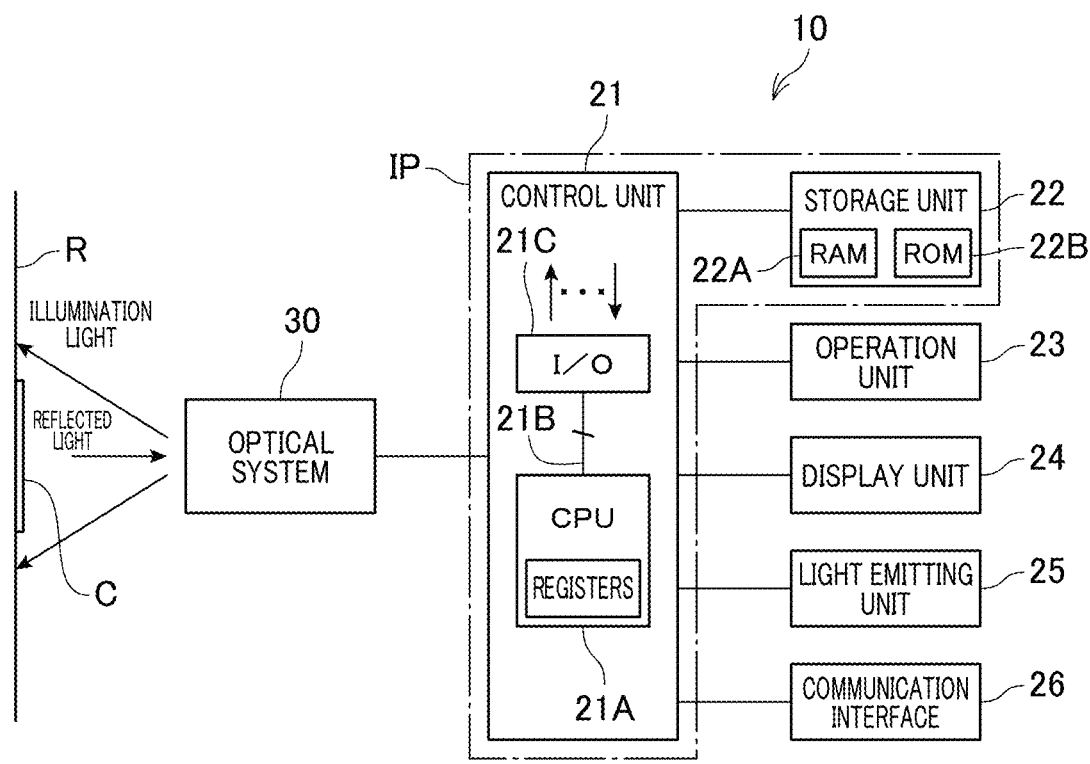
FIG. 1 is a block diagram schematically illustrating a configuration of an optical information reader according to a first embodiment.

An optical information reader 10 shown in FIG. 1 is configured as a reading device that optically reads information contained in an information medium such as an information code such as a bar code or a QR code (registered trademark) or character information. Therefore, in the present disclosure, since the information medium such as the information code and the character information is read through the reflected light, it is also referred to as optical information. The optical information reader 10 has an outer shell formed by a case (not shown), and various electronic components are housed in the case.

Inside the case of the optical information reader 10, a control unit 21 that controls the entire optical information reader 10 is provided. The control unit 21 is composed mainly of the elements of the microcomputer, and has elements such as a CPU 21A having registers, a system bus 21B, and an input/output (I/O) interface 21C, and constitutes an information processing device IP together with a storage unit 22. The control unit 21 is configured to decode the data recorded in the information code by a predetermined decoding method by a reading process performed by using the captured image of the information code captured by the light receiving sensor 32 of the optical system 30 described later. The storage unit 22 is configured by using, for example, a semiconductor memory, and as an example, a RAM (random access memory) 22A and a ROM (read-only memory) 22B are provided. The RAM 22A is used as the main memory of the CPU 21A. A predetermined program or the like for executing a reading process or the like is stored in the ROM 22B in advance so as to be executable by the control unit 21 (CPU 21A). The ROM 22B also functions as a non-transitory computer-readable recording medium. The control unit 21 can correspond to an example of a "reading unit" that reads an information code according to the light receiving result of the light receiving sensor 32. The CPU is also called a microprocessor or a processor.

Further, the optical information reader 10 includes an operation unit 23, a display unit 24, a light emitting unit 25, a communication interface 26, and the like. The operation unit 23 includes one or a plurality of keys provided on the outer surface of the case or the like, and is configured to give an operation signal to the control unit 21 in response to a user's key operation. When the control unit 21 receives an operation signal from the operation unit 23, the control unit 21 is configured to perform an operation in response to the operation signal. The display unit 24 is composed of a liquid crystal member or the like, and is controlled by the control unit 21 so as to display the reading result of the information code or the like on the screen. The light emitting unit 25 is, for example, an LED, and is configured to light up or the like in response to a signal from the control unit 21. The communication interface 26 is configured as an interface for performing data communication with an external device such as a host device, and is configured to perform communication processing in cooperation with the control unit 21.

Figure 2:
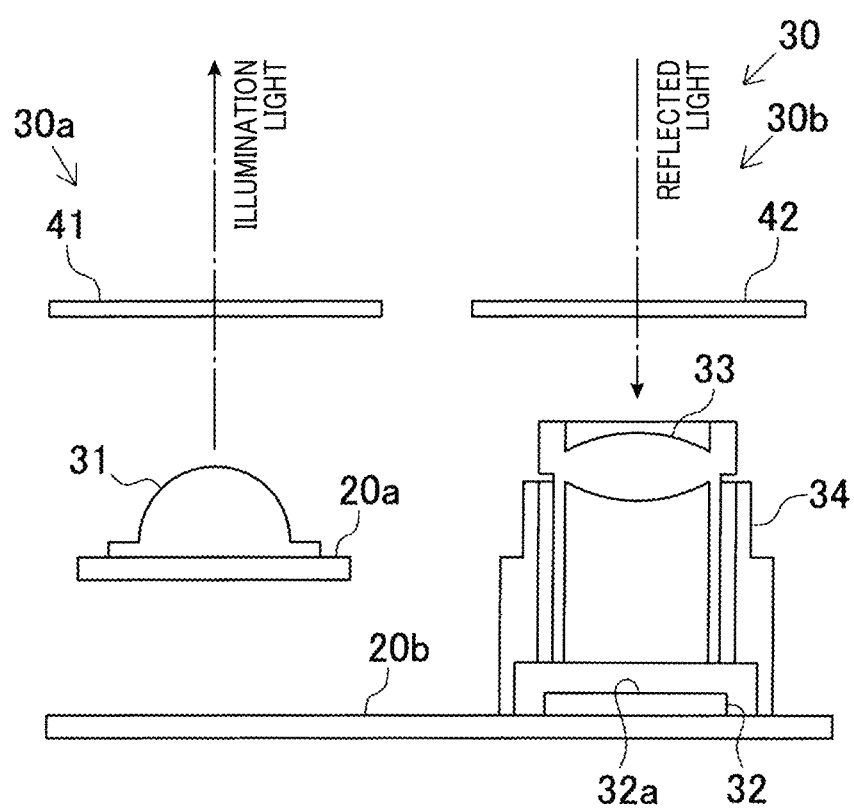
FIG. 2 is an explanatory diagram illustrating the configuration of the optical system of FIG. 1.

Further, the optical information reader 10 is controlled by a control unit 21 (specifically, CPU 21A) and includes an optical system 30 for optically reading an information code or the like. As shown in FIG. 2, the optical system 30 is divided into a projection optical system 30a that emits illumination light toward an information medium such as an information code and a light receiving optical system 30b that receives reflected light from an information medium such as an information code. The projection optical system 30a includes an illumination unit 31 that emits illumination light toward an information code, and a first polarizing unit 41 that is arranged on the emission side of the illumination unit 31. The lighting unit 31 is configured to have a light source such as an LED, a lighting lens, or the like, and it is mounted on the circuit board 20a so as to irradiate the imaging range of the light receiving optical system 30b through a reading port (not shown) formed in the case.

The first polarizing unit 41 is a so-called polarizing plate, and the illumination light incident from the illumination unit 31 is always polarized in a predetermined polarization direction and is irradiated toward the imaging range through the reading port.

The light receiving optical system 30b includes a light receiving sensor 32, an imaging lens 33, a second polarizing unit 42, and the like. The light receiving sensor 32 is configured as an area sensor in which light receiving elements, which are solid-state imaging elements such as C-MOS and CCD, are arranged two-dimensionally, and has a light receiving surface 32a as a rectangular light receiving region. The light receiving sensor 32 is mounted on the circuit board 20b so that light incident through the imaging lens 33 (light reflected from an information medium such as an information code) can be received by the light receiving surface 32a. The light receiving sensor 32 can correspond to an example of the "light receiving unit".

The imaging lens 33 functions as an imaging optical system capable of condensing light incident on the inside of the case through the reading port and forming an image on the light receiving surface 32a of the light receiving sensor 32. By being fixed to the holder 34 assembled to the circuit board 20b, the light receiving sensor 32 and the like are positioned. In the present embodiment, the illumination light emitted from the illumination unit 31 via the first polarizing unit 41 is reflected by the information code C and the article R to which the information code C is attached (FIG. 1), reference), and the reflected light is collected by the imaging lens 33 in a state of passing through the second polarizing unit 42, and a code image is formed on the light receiving surface 32a of the light receiving sensor 32.

As shown in FIG. 2, the second polarizing unit 42 is arranged on the incident side of the imaging lens 33 (the light-reception side of the light receiving sensor 32). The second polarizing unit 42 is configured to be switchable between polarized state in which the light reflected from the information code through the reading port is polarized in a direction different from the polarization direction of the first polarizing unit 41, and a passing state in which the reflected light passes without being polarized. In this embodiment, the second polarizing unit 42 can correspond to an example of the "switching polarizing unit".

Figure 3:
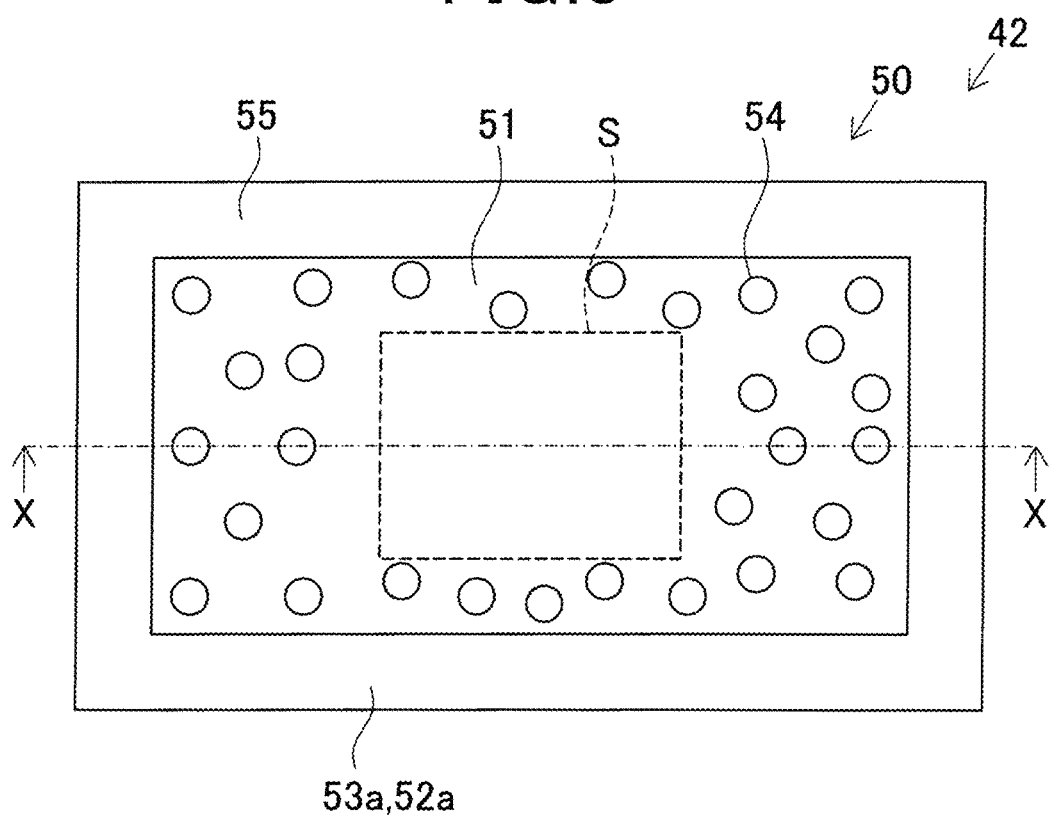
FIG. 3 is a plan view showing a schematic configuration of a second polarizing unit of FIG. 2.
Figure 4:
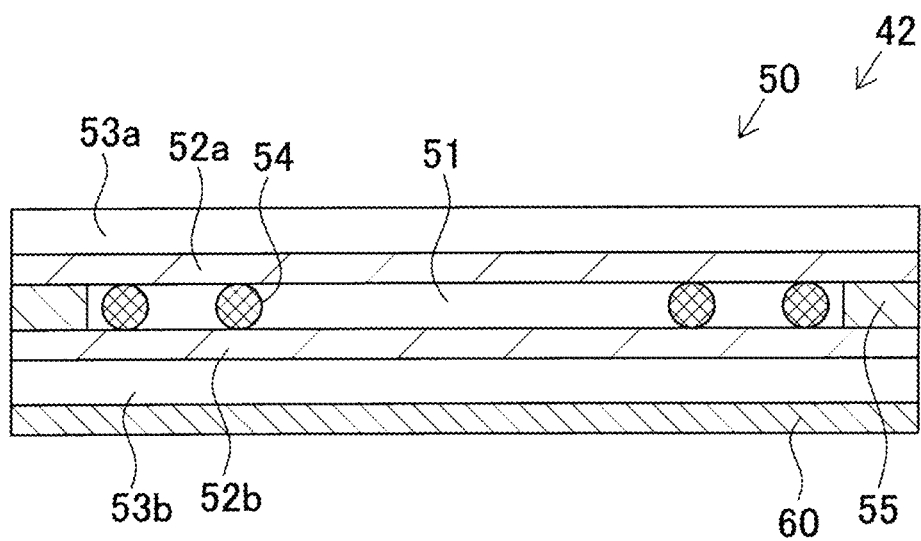
FIG. 4 is a schematic cross-sectional view schematically showing an XX cross section of the second polarizing unit of FIG. 3.

Specifically, as shown in FIGS. 3 and 4, the second polarizing unit 42 is configured to include a rectangular liquid crystal member 50 and a polarizing plate 60. The liquid crystal member 50 is configured such that liquid crystal layer 51 containing the spacer 54, a pair of rectangular alignment films 52a, 52b facing each other via the liquid crystal layer 51 sealed by the sealing material 55, and glass substrates 53a and 53b for protecting from both sides are laminated.

In the liquid crystal layer 51, a content rate of the spacer 54 in the central region (see reference numeral S in FIG. 3), which is the imaging range (light receiving range) of the light receiving sensor 32, is lower than a content rate of the spacer 54 in the peripheral region, which is a range different from the imaging range. For example, by masking the central region when the spacer 54 is sprayed, it is possible to form a region in which the content rate of the spacer 54 is low. Further, the pair of alignment films 52a and 52b are arranged so that the rubbing directions differ from each other by 90°.

The liquid crystal member 50 is configured so that the voltage application state is controlled by the control unit 21 (CPU 21A). Therefore, according to the control by the control unit 21, the liquid crystal member 50 switches between a state in which the incident light is emitted so that the polarization direction changes by 90° because no voltage is applied, and a state in which the incident light is emitted as it is without the polarization direction changing when the voltage is applied.

The polarizing plate 60 is configured so that incident light incident on the liquid crystal member 50 is always polarized in a direction different from the polarization direction of the first polarizing unit 41 and is emitted toward the imaging lens 33.

That is, the second polarizing unit 42 is composed of a combination of the liquid crystal member 50 and the polarizing plate 60 so as to omit one polarizing plate on the incident side from the TN type liquid crystal.

In the second polarizing unit 42 configured in this way, when a voltage is applied to the liquid crystal member 50, the reflected light from the information code or the like is incident on the polarizing plate 60 from the liquid crystal member 50 without changing its polarization direction. In this case, since the polarization direction of the reflected light emitted from the liquid crystal member 50 and the polarization direction of the polarizing plate 60 are different by 90°, the reflected light is polarized in a direction different from the polarization direction of the first polarizing unit 41. On the other hand, when no voltage is applied to the liquid crystal member 50, the reflected light from the information code or the like is incident on the polarizing plate 60 so as to change the polarization direction from the liquid crystal member 50 by 90°. In this case, since the polarization direction of the reflected light emitted from the liquid crystal member 50 and the polarization direction of the polarizing plate 60 are the same, the reflected light already polarized passes through without being polarized. That is, the second polarizing unit 42 is configured as a switching polarizing unit that can be switched between a polarized state in which the reflected light is polarized in a direction different from the polarization direction of the first polarizing unit 41 and a passing state in which the reflected light passes without being polarized according to the voltage control of the liquid crystal member 50 by the control unit 21. Therefore, the control unit 21 functions to control switching between the polarization state and the passing state in the second polarization unit 42.

In the optical information reader 10 configured in this way, in the reading process performed by the control unit 21 (CPU 21A) when reading the information code, when reading the information code to suppress the influence of specular reflection, the second polarizing unit 42 is switched to the polarized state. Also, when reading the information code or the like formed on the uneven surface, the second polarizing unit 42 can be switched to the passing state.

As described above, in the optical information reader 10 according to the present embodiment, the first polarizing unit 41 arranged on the light-exit side of the illumination unit 31 is configured so that the illumination light is polarized in a predetermined polarization direction. The second polarizing unit 42 arranged on the light-reception side of the light receiving sensor 32 is configured as a switching polarizing unit that can switch between a polarized state in which the reflected light from the information code is polarized in a direction different from the above-mentioned predetermined polarization direction and a passing state in which already polarized reflected light passes through without being polarized.

As a result, by switching the second polarizing unit 42 to the polarized state, the polarization direction of the first polarization unit 41 and the polarization direction of the second polarization unit 42 become different directions. Therefore, when receiving the reflected light from the information code, the influence of the specular reflection caused by the illumination light from the illumination unit 31 can be suppressed. On the other hand, by switching the second polarizing unit 42 to the passing state, the contrast to the code region is not lost even when reading the information code or the like formed on the uneven surface since the reflected light that has already been polarized is no longer polarized by the second polarizing unit 42. Therefore, it is possible to switch to a polarized state suitable for reading an information code without adopting a plurality of types of lighting units.

Then, by configuring the second polarizing unit 42 as the switching polarizing unit, the following effects are obtained. When the first polarizing unit 41 arranged on the light-exit side of the lighting unit 31 is configured as the switching polarizing unit, the number of the first polarizing units 41 increases as the number of the illumination units 31 increases, and the number of parts may increase. Therefore, even when increasing the number of lighting units 31 to secure the amount of light, etc., it is not necessary to increase the number of the second polarizing units 42, and it is possible to suppress an increase in the number of parts by enabling the second polarizing unit 42 arranged on the light-reception side of the light receiving sensor 32 to switch between the polarized state and the passing state.

In particular, the second polarizing unit 42 is configured as a switching polarizing unit by the liquid crystal member 50 and the polarizing plate 60. The liquid crystal member 50 has a function of switching the incident light between a state in which the incident light is emitted so that the polarization direction changes by 90° and a state in which the incident light is emitted as it is without changing the polarization direction. By combining the liquid crystal member 50 and the polarizing plate 60 which are configured to remove one polarizing plate from a normal TN type liquid crystal, it is possible to inexpensively realize a configuration capable of switching between a polarized state and a passing state.

Further, in the liquid crystal layer 51 containing the spacer 54, the spacer 54 is formed so that the content rate of the spacer 54 in the central region S, which is the imaging range of the light receiving sensor 32, is lower than the content rate of the spacer 54 in the peripheral region, which is a range different from the light receiving range. As a result, even when the liquid crystal member 50 and the light receiving sensor 32 are arranged so as to be close to each other on the optical axis, it becomes difficult for the spacer 54 to be imaged, and deterioration of the quality of the captured image due to the spacer 54 in the liquid crystal layer 51 can be suppressed.

Second Embodiment

Next, the optical information reader according to the second embodiment will be described with reference to the drawings. The same reference numerals are used for the components having the same or similar functions as the components of the first embodiment, and the description thereof will be omitted or simplified. This explanatory method is the same in various embodiments described later. The second embodiment is mainly different from the first embodiment in that the first polarizing section 41 is configured as a switching polarizing section and the second polarizing section 42 is configured as a polarizing plate.

Specifically, the first polarization unit 41 arranged on the emission side of the illumination unit 31 is configured as a switching polarization unit that can switch between first polarization state in which the illumination light is polarized in the first polarization direction and a second polarization state in which the illumination light is polarized in a second polarization direction (for example, a direction 90° different from the first polarization direction). Therefore, in the present embodiment, the first polarizing unit 41 includes a liquid crystal member 50 and a polarizing plate 60, and the polarizing plate 60 is configured to be on the incident side. The second polarizing unit 42 arranged on the light-reception side of the light receiving sensor 32 is a polarizing plate whose polarization direction differs from that of the polarizing plate 60 by 90°, and the reflected light from the information code is always polarized in the second polarization direction.

Even in this way, by switching the first polarization unit 41 to the first polarization state, the polarization direction of the first polarization section 41 and the polarization direction of the second polarization section 42 are different directions. Therefore, when receiving the reflected light from the information code, the influence of the specular reflection caused by the illumination light from the illumination unit 31 can be suppressed. On the other hand, by switching the first polarizing unit 41 to the second polarization state, the polarization direction of the first polarization unit 41 and the polarization direction of the second polarization unit 42 become the same direction, so the reflected light that has already been polarized is no longer polarized by the second polarizing unit 42, and even when the information code or the like formed on the uneven surface is read, the contrast to the code region is not lost. Therefore, it is possible to switch to a polarized state suitable for reading an information code without adopting a plurality of types of lighting units.

Then, by configuring the first polarizing unit 41 as the switching polarizing unit, the following effects are obtained. When the second polarizing unit 42 arranged on the light-reception side of the light receiving sensor 32 is configured as the switching polarizing unit, depending on the performance of the imaging system including the light receiving sensor 32 (for example, the number of sensor pixels, the resolution of the imaging lens, etc.), the quality of the captured image may deteriorate caused by a defect of the second polarizing unit 42 (for example, dust adhesion, glass scratches, chips, etc.) or the like. Therefore, by configuring the first polarization unit 41 arranged on the emission side of the illumination unit 31 as a switching polarization unit capable of switching between the first polarization state and the second polarization state, the distance between the first polarizing unit 41 and the light receiving sensor 32 on the optical axis can be increased. It is possible to suppress deterioration of the quality of the captured image due to defects in the first polarizing unit 41 and the like.

Third Embodiment

Next, the optical information reader according to the third embodiment will be described with reference to FIGS. 5 to 8. The third embodiment is mainly different from the first embodiment in that the liquid crystal member is configured so that the rubbing direction of the pair of alignment films is different from the rubbing direction of the pair of alignment films in the first embodiment. Therefore, the same components as those of the first embodiment are designated by the same reference numerals, and the description thereof will be omitted.

Figure 5:
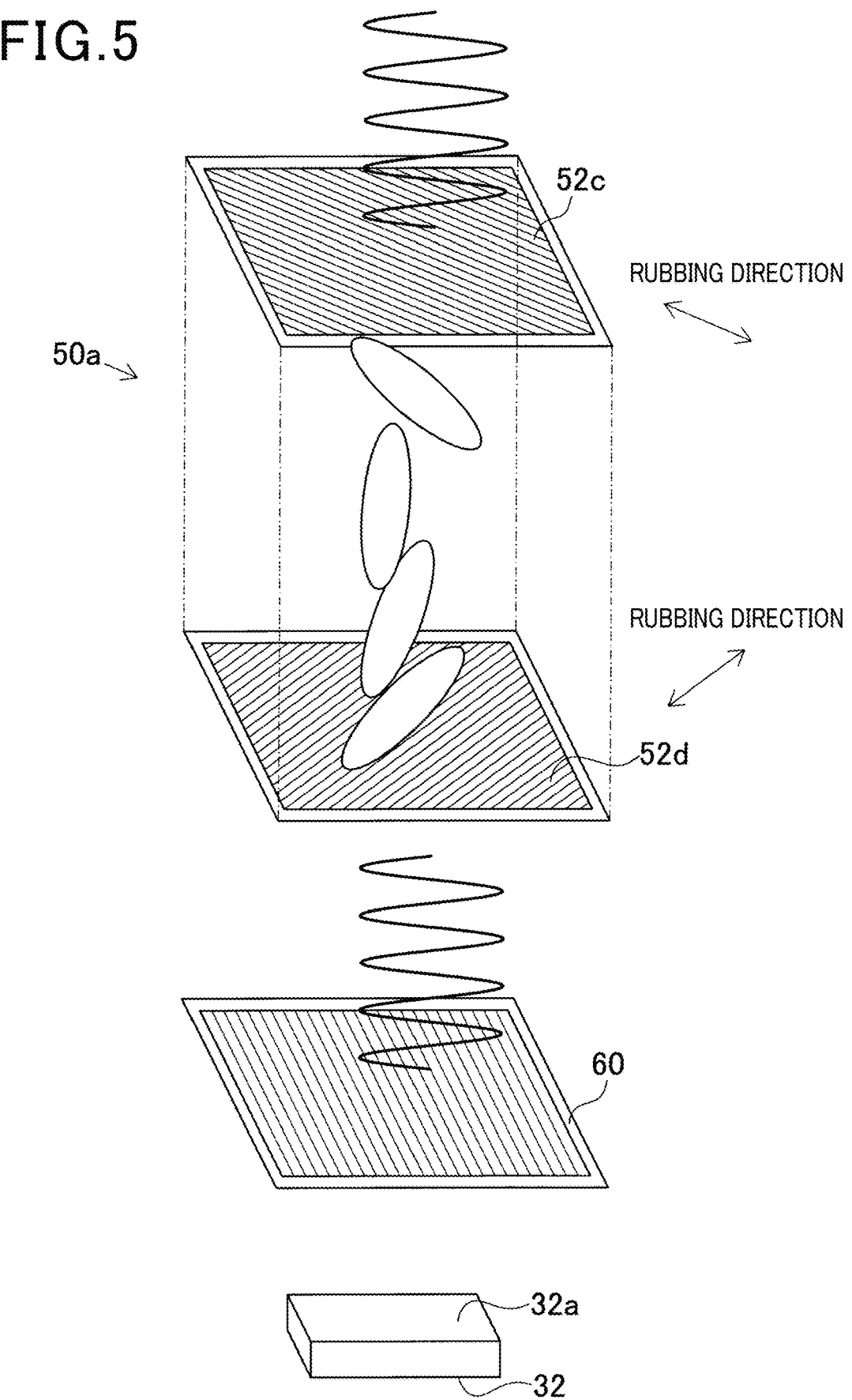
FIG. 5 is an explanatory diagram illustrating a second polarizing unit adopted in the optical information reader according to the third embodiment.
Figure 6:
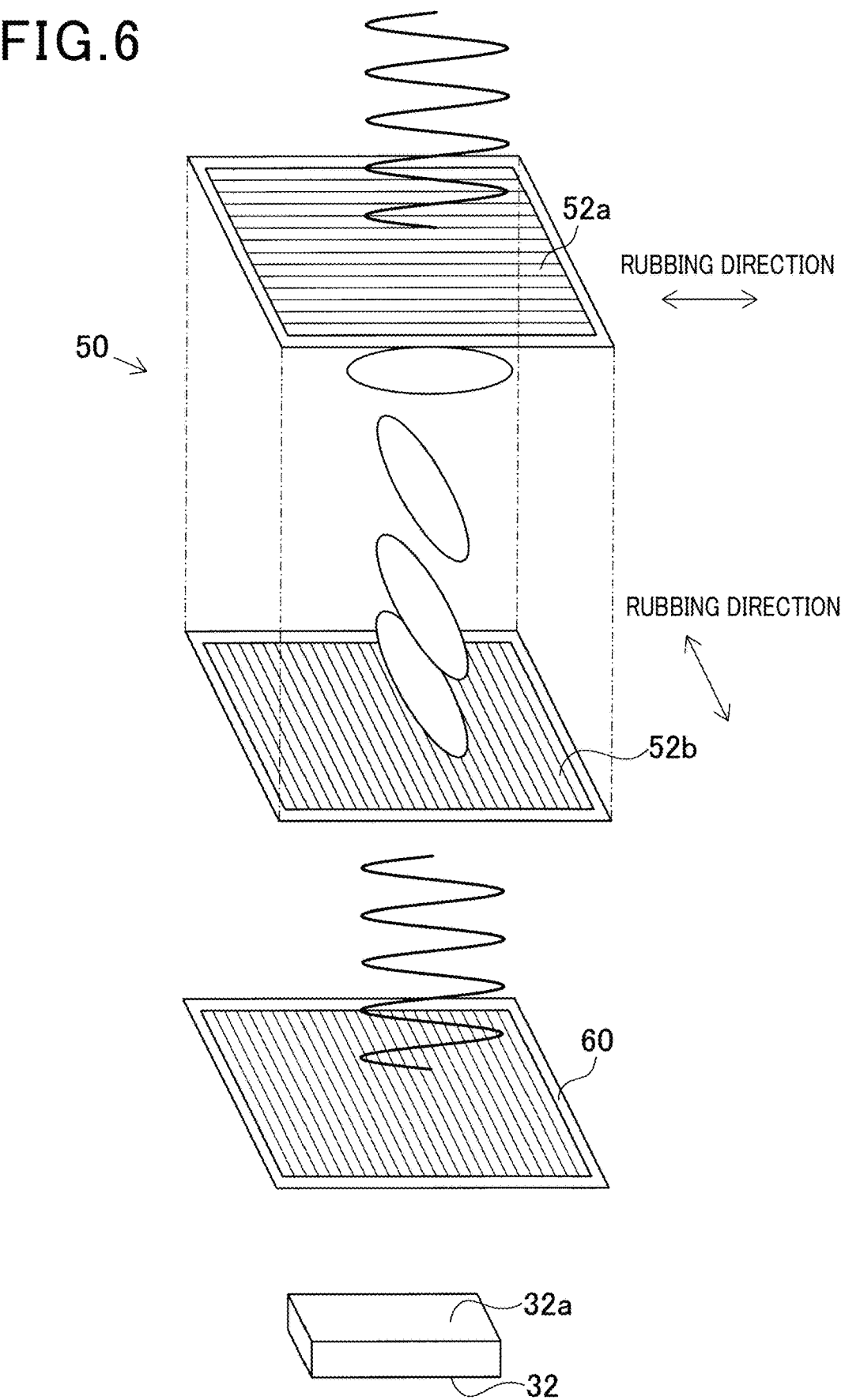
FIG. 6 is an explanatory diagram illustrating a polarizing unit in which a conventional alignment film in which a rubbing direction is parallel (orthogonal) to one side of an outer edge with respect to FIG. 5 is adopted.

In the present embodiment, the liquid crystal member 50a is adopted in the second polarizing unit 42 instead of the liquid crystal member 50 described above. As shown in FIG. 5, the pair of alignment films 52c and 52d used in the liquid crystal member 50a are formed so that their rubbing directions are inclined with respect to one side of the outer edge of the alignment films 52c and 52d. In FIGS. 5 and 6, for convenience of explanation, some liquid crystal molecules are exaggerated and shown, and some parts are not shown except for the alignment film, the polarizing plate, and the light receiving sensor, which are shown in a simplified manner.

The effect of tilting the rubbing direction with respect to one side of the outer edge of the alignment film will be described with reference to the drawings. Normally, the alignment film formed in a rectangular shape is formed so that the rubbing direction is parallel (orthogonal) to one side of the outer edge of the alignment film, as in the alignment films 52*a* and 52*b* shown in FIG. 6. It is known that when two such alignment films 52*a* and 52*b* are used to receive polarized light, the contrast of the end portion in a direction inclined by about 45° with respect to the rubbing direction becomes low.

Figure 8:
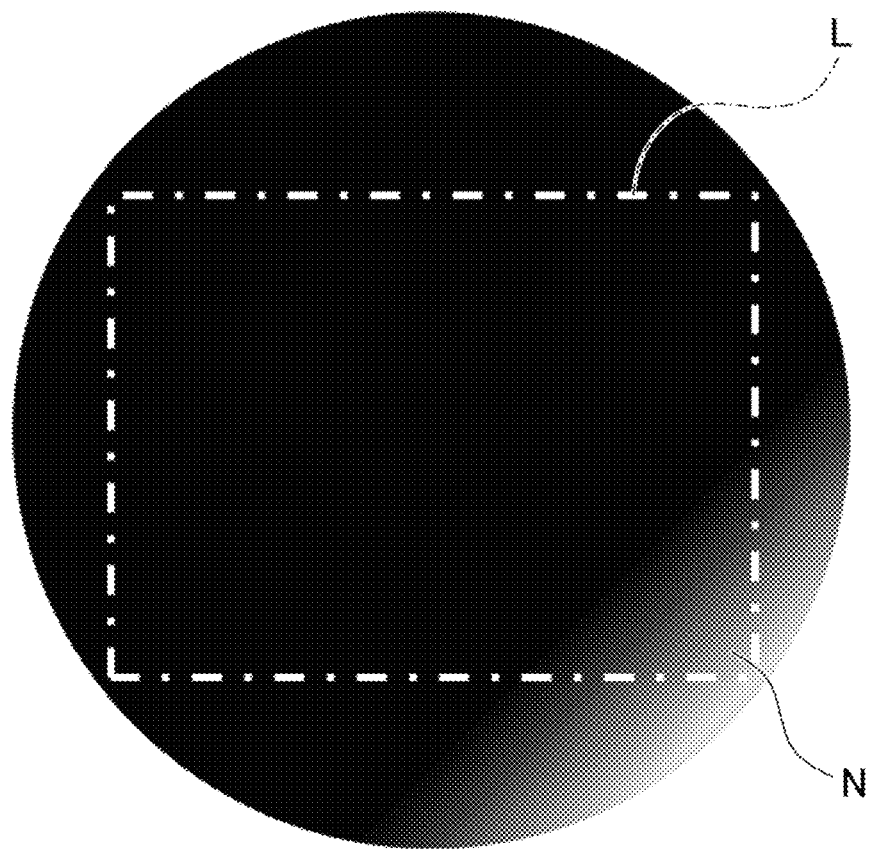
FIG. 8 is an explanatory diagram illustrating a light receiving range via a polarizing unit in which the liquid crystal member of FIG. 6 is adopted.

Therefore, the liquid crystal member 50 having the alignment films 52*a* and 52*b* in the orientation direction as shown in FIG. 6 is arranged so that the outer edges of the alignment films 52*a* and 52*b* and the outer edge of the light receiving surface 32*a* are parallel to the light receiving sensor 32 in which the light receiving surface 32*a* is formed in a rectangular shape. The light receiving sensor 32 has a light receiving range as shown in FIG. 8. That is, in the rectangular light receiving range (see reference numeral L in FIG. 8), the vicinity of a corner portion, which is inclined by about 45° with respect to the rubbing direction, becomes a low contrast region (see reference numeral N in FIG. 8), which may lead to a decrease in the reading success rate.

Therefore, in the present embodiment, as in the pair of alignment films 52*c* and 52*d* shown in FIG. 5, the rubbing direction is formed so as to be inclined with respect to one side of the outer edge of the alignment films 52*c* and 52*d*. In the present embodiment, the alignment films 52*c* and 52*d* are formed so that their rubbing direction is inclined by, for example, about 45° with respect to one side of the outer edge. That is, the plane along the alignment films 52*c* and 52*d* is parallel to the light receiving surface 32*a*, and the liquid crystal member 50*a* is arranged so that the outer edge of the alignment films 52*c* and 52*d* and the outer edge of the light receiving surface 32*a* are parallel to the light receiving sensor 32. Then, the alignment films 52*c* and 52*d* are arranged so that the rubbing direction is tilted with respect to one side of the outer edge of the light receiving surface 32*a* of the light receiving sensor 32.

As a result, the range N at which the contrast becomes low can be changed from the direction inclined by about 45° to a different direction. Therefore, the range N where the contrast becomes low tends to deviate from the rectangular light receiving range L, and the decrease in the reading success rate due to the decrease in the contrast can be suppressed.

Figure 7:
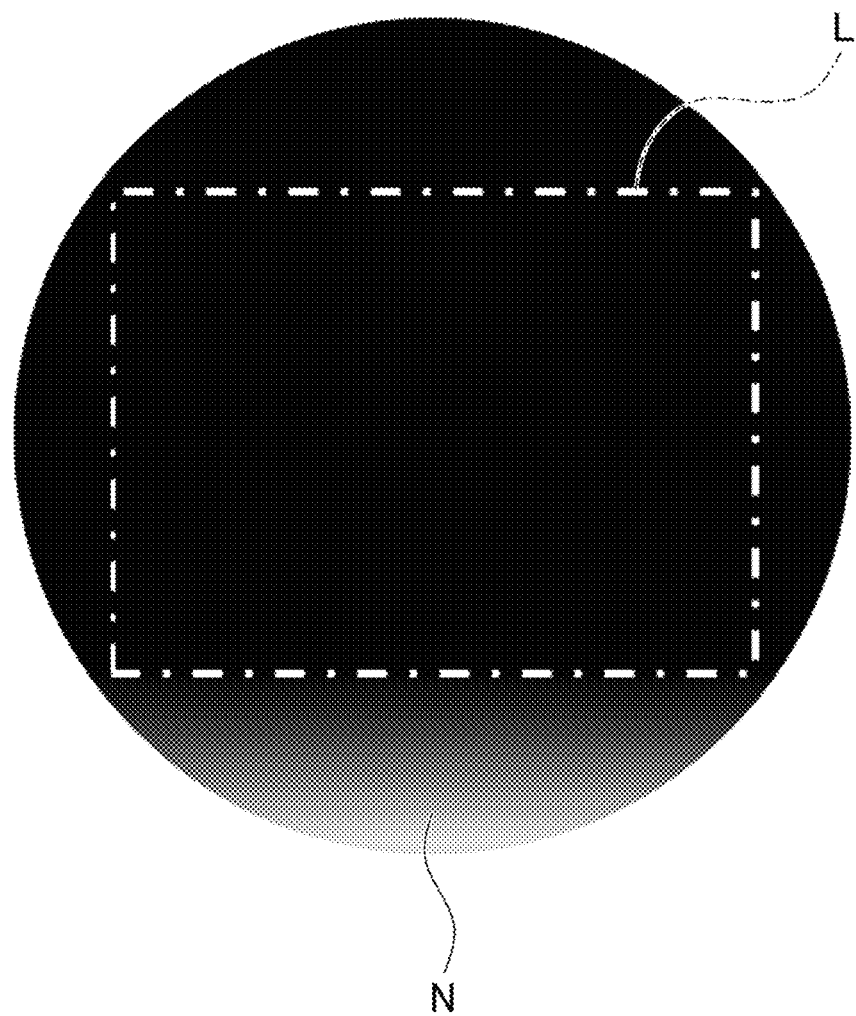
FIG. 7 is an explanatory diagram illustrating a light receiving range via a second polarizing unit in which the liquid crystal member of FIG. 5 is adopted.

For example, as described above, when the rubbing direction is formed so as to be tilted by about 45° with respect to one side of the outer edge, the range N in which the contrast becomes low can be excluded from the light receiving range L as shown in FIG. 7. When the alignment films 52*c* and 52*d* are not limited to be formed so that their rubbing directions are inclined by about 45° with respect to one side of the outer edge, as long as they are arranged so as to be inclined with respect to one side of the outer edge of the light receiving surface 32*a* of the light receiving sensor 32, for example, it may be formed so as to be tilted by about 30°, or may be formed so as to be tilted by about 60°.

The characteristic configuration of the present embodiment formed so that the rubbing direction of the pair of alignment films is inclined with respect to one side of the outer edge of the alignment film can be applied to other embodiments and the like.

Fourth Embodiment

Next, the optical information reader according to the fourth embodiment will be described with reference to the drawings. The fourth embodiment is mainly different from the first embodiment in that the information code is imaged while controlling the switching (switching state) between the polarized state and the passing state. Therefore, the same components as those of the first embodiment are designated by the same reference numerals, and the description thereof will be omitted.

In the present embodiment, it is premised that an information code or the like for suppressing the influence of specular reflection and an information code or the like formed on an uneven surface are mixed as reading targets. In the reading process performed by the control unit 21 when the information code is optically read, the second polarizing unit 42 switches according to a predetermined switching frequency.

Figure 9:
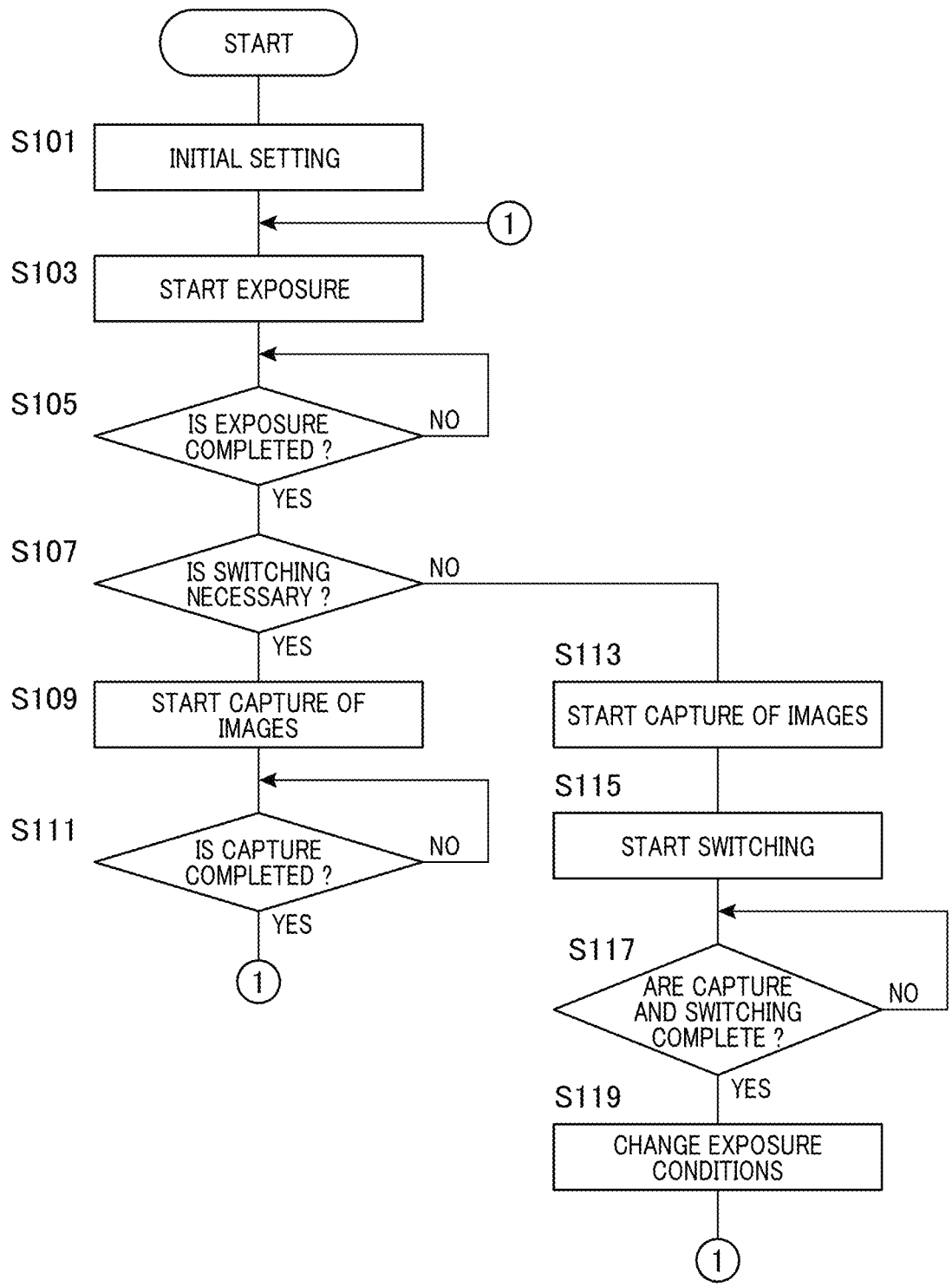
FIG. 9 is a flowchart illustrating a flow of a reading process performed by the control unit in the fourth embodiment.

Hereinafter, in the present embodiment, the reading process performed by the control unit 21 will be described in detail with reference to the flowchart shown in FIG. 9. When the control unit 21 starts the reading process in response to a predetermined operation on the operation unit 23, the initial setting process shown in step S101 of FIG. 9 is performed. In this process, the switching frequency, exposure conditions, and the like in the second polarizing unit 42 are set based on a predetermined reading condition table. In the following description, at the start of the reading process, the second polarizing unit 42 is in a polarized state by applying a voltage to the liquid crystal member 50, and a case where the switching frequency is predetermined so that the process of capturing one captured image in the passing state is repeated after the two captured images are captured in the polarized state will be described in detail. Further, the exposure conditions related to the light receiving sensor 32 and the like are different between the polarized state and the passing state, and are set in advance to the conditions suitable for each.

When the switching frequency and the like are set as described above, the exposure by the light receiving sensor 32 is started under the preset exposure conditions in response to the instruction by the control unit 21 (S103). Then, when this exposure is completed (Yes in S105), the determination process in step S107 determines whether or not to perform switching in the second polarizing unit 42. Here, if it is determined that switching is not necessary according to the switching frequency, it is determined as No in step S107, and the storage unit 22 is started to capture the captured image from the light receiving sensor 32 that has been exposed (S109). Then, when this uptake is completed (Yes in S111), the exposure is started again (S103).

Then, when the exposure is completed (Yes in S105), when switching is performed by the second polarizing unit 42 according to the switching frequency, it is determined to be Yes in step S107. In this case, the capture of the captured image from the light receiving sensor 32 that has completed the exposure is started (S113), and the switching by the second polarizing unit 42 is started (S115). When switching from the polarized state to the passing state is started, the application of the voltage to the liquid crystal member 50 is stopped.

Subsequently, in the determination process of step S117, it is determined whether or not both the acquisition of the captured image into the storage unit 22 and the switching of the second polarizing unit 42 are completed, and the determination of No is repeated until both the acquisition of the captured image into the storage unit 22 and the switching of the second polarizing unit 42 are completed. The control unit 21 that detects the completion of switching of the second polarizing unit 42 in step S117 may correspond to an example of the "detection unit".

Then, when both the acquisition of the captured image into the storage unit 22 and the switching of the second polarizing unit 42 are completed (Yes in S117), the exposure conditions are changed to suit the state after the switching (S119), and the exposure is started again (S103). When the polarized state is switched to the passing state, the exposure conditions are changed to suit the passing state, and the exposure is restarted.

Then, as described above, while the process of capturing the captured image into the storage unit 22 and switching the second polarizing unit 42 is repeated when the exposure is completed, each time the captured images are sequentially stored in the image buffer prepared in the storage unit 22 when the capture is completed, the control unit 21 performs a decoding process for decoding (decoding) the information code for the captured images.

Further, another example for setting the switching frequency, a reading flow will now be explained with reference to a timing chart shown in FIG. 10, in which one image is captured in the polarized state and then one image is captured in the passing state, and such image capture is repeated in turn.

Figure 10:
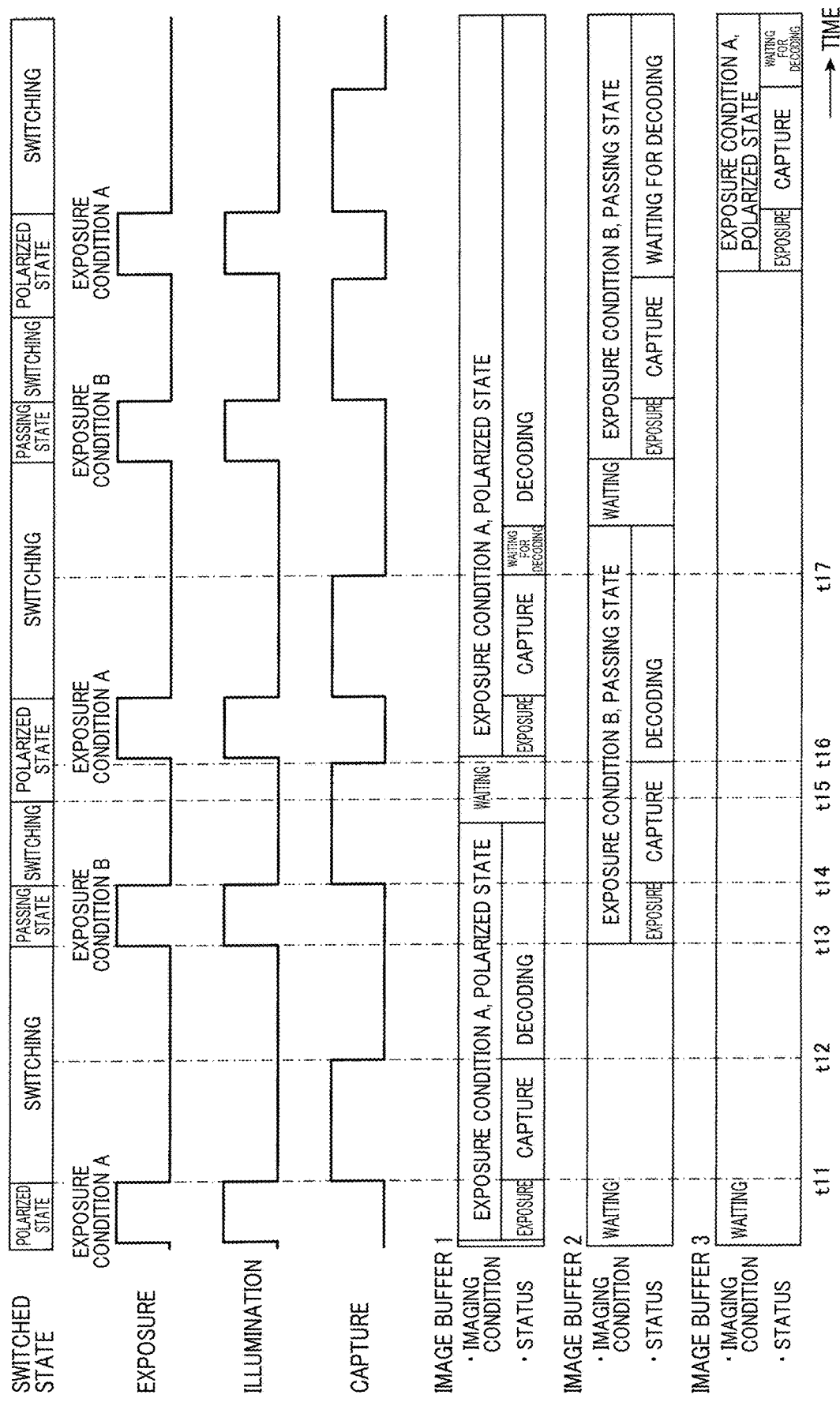
FIG. 10 is a timing chart for explaining a flow of a reading process when a switching frequency is set so that a process of capturing one captured image in a polarized state and then capturing one captured image in a passing state is repeated.

As shown in FIG. 10, the light receiving sensor 32 starts the exposure in the state where the polarization state is first set and the exposure condition (exposure condition A) suitable for the polarization state is set. Then, when the exposure is completed (see t11 in FIG. 10), the capture of the captured image from the light receiving sensor 32 that has completed the exposure is started, and the switching from the polarized state to the passing state is started. Then, when the captured image is stored in the image buffer 1 prepared in the storage unit 22 when the capture is completed (see t12 in FIG. 10), the decoding process is started for the stored captured image without waiting for the completion of switching. In the present embodiment, the captured image is stored and held in the image buffer until the decoding process is completed, and is deleted when the decoding process is completed.

Then, when the switching from the polarized state to the passing state is completed (see t13 in FIG. 10), the exposure by the light receiving sensor 32 is started in a state where the exposure condition (exposure condition B) suitable for the switched passing state is set. Then, when the exposure is completed (see t14 in FIG. 10), the capture of the captured image from the light receiving sensor 32 that has completed the exposure is started, and the switching from the passing state to the polarized state is started. If the decoding process is not completed at the start of exposure, as shown in FIG. 10, the captured image captured by this exposure is stored in the image buffer 2 prepared by the storage unit 22. After that, if the capture is not completed even after the switching is completed (see t15 in FIG. 10), the exposure is not started and the exposure is not started. When the capture is completed after the switching is completed (see t16 in FIG. 10), the decoding process is started for the stored captured image, and the exposure is started.

Then, if the decoding process started earlier is not completed even if the capture of the captured image is completed after the exposure is completed (see t17 in FIG. 10), the decoding process for the captured image that has been captured is in a standby state until the previous decoding process is completed. Then, the captured images that have been captured before the previous decoding process is completed are sequentially stored in the image buffers individually prepared by the storage unit 22.

As described above, in the optical information reader 10 according to the present embodiment, the control unit 21 controls the switching of the second polarizing unit 42, and functions as a detection unit that detects the completion of the switching in the second polarizing unit 42 in the reading process. The light receiving sensor 32 is controlled by the control unit 21 so as to respond to the detection result by the detection unit, and starts exposure after the switching by the second polarizing unit 42 is completed (Yes in S117).

As a result, since the exposure by the light receiving sensor 32 is started after the switching by the second polarizing unit 42 is surely completed, the image being switched by the second polarizing unit 42 is not captured, and an image suitable for reading can be captured.

In particular, the present embodiment includes a storage unit 22 in which captured images captured from the light receiving sensor 32 are sequentially stored as an image buffer, and every time the captured image is stored in the storage unit 22, a decoding process for decoding the information code is performed on the captured image. As a result, even during switching by the second polarizing unit 42, decoding processing can be performed on the captured image that has already been captured, and the processing efficiency can be improved as compared with the case where the decoding process is started after the switching in the second polarizing unit 42 is completed.

Further, in the present embodiment, since the control unit 21 switches in the second polarizing unit 42 according to a predetermined switching frequency, the information code can be smoothly read even when information codes that should suppress the influence of specular reflection or information codes formed on uneven surfaces are mixed as reading targets.

In the reading process performed in the second embodiment in which the first polarizing unit 41 functions as the switching polarizing unit, the first polarizing unit 41 may perform switching according to a predetermined switching frequency or the like.

Fifth Embodiment

Next, the optical information reader according to the fifth embodiment will be described with reference to the drawings. The fifth embodiment is mainly different from the fourth embodiment in that the switching frequency and the like in the switching polarizing unit are set by using the decoded result in the decoding process. Therefore, the same components as those of the fourth embodiment are designated by the same reference numerals, and the description thereof will be omitted.

In the present embodiment, the switching frequency and the exposure conditions and the like in the second polarizing unit 42 are set according to the comparison result between the decoded result of decoding processing for the captured image captured from the light receiving sensor 32 in the polarized state switched by the second polarizing unit 42 and the decoded result of decoding processing for the captured image captured from the light receiving sensor 32 in the passing state in the switching frequency and the like setting process performed by the control unit 21.

Specifically, for example, when sequentially reading the information code attached to each of a plurality of articles, one article is extracted from these plurality of articles, and the information code attached to the extracted article is subjected to a reading test by changing the exposure conditions and the like in the polarized state and the passing state, respectively. Then, according to the reading result of the reading test, the switching frequency, the exposure condition, and the like suitable for reading the information codes attached to the plurality of articles are set. The control unit 21 that performs the switching frequency and the like setting process can correspond to an example of the "setting unit" that sets the switching frequency in the switching polarizing unit.

Figure 11:
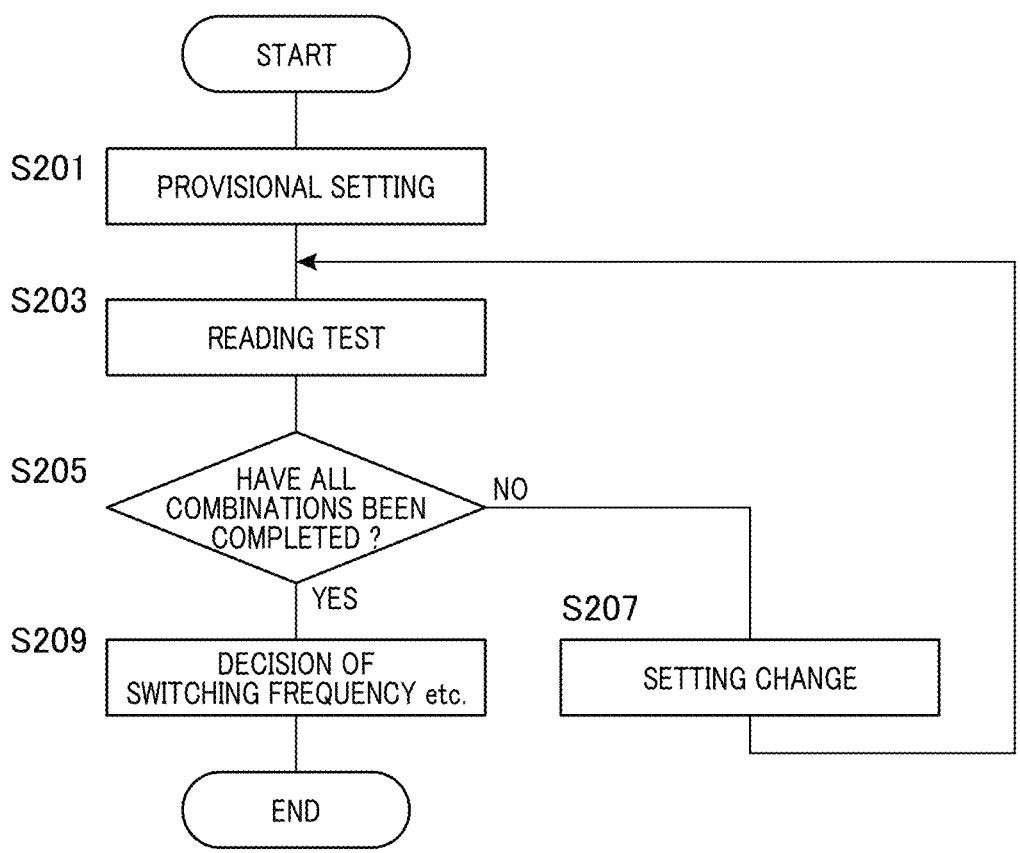
FIG. 11 is a flowchart illustrating a flow of setting processing such as switching frequency performed by the control unit in the fifth embodiment.

Hereinafter, in the present embodiment, the switching frequency and the like setting processing performed by the control unit 21 will be described in detail with reference to the flowchart shown in FIG. 11. When the control unit 21 starts the switching frequency and the like setting process in response to a predetermined operation on the operation unit 23, the temporary setting process shown in step S201 of FIG. 11 is performed. In this process, the switching state (polarization state, passing state), exposure condition, etc. of the second polarizing unit 42 of a plurality of patterns prepared in advance for the reading test are read, and temporarily set to the initial switching state and exposure condition.

Then, when the initial setting of the switching state for the reading test and the exposure condition is completed, the reading test in which the process of reading the information code is repeated a predetermined number of times is performed (S203). Then, when all the switching states and the combination of the exposure conditions read for the reading test are not implemented (No in S205), the setting is changed to the next switching state and exposure condition (S207), and the reading test is performed again (S203).

Then, when the reading test is performed for all the switching states and the combination of the exposure conditions read for the reading test (Yes in S205), the switching frequency and the exposure conditions are determined according to the comparison result of the reading test (S209).

For example, as illustrated in the part (A) of FIG. 12, when the reading success rate is obtained as a result of performing the reading test under four types of exposure conditions A to D for each of the polarized state and the passing state, the exposure conditions with the highest reading success rate are selected, and the switching frequency is set according to the ratio of the reading success rates under the selected exposure conditions. In the example of the part (A) of FIG. 12, the reading success rate under the exposure condition A is the highest at 90% in the polarized state, and the reading success rate under the exposure condition B is the highest at 90% in the passing state. Therefore, as illustrated in the part (B) of FIG. 12, the switching frequency of the ratio of the polarized state and the exposure condition A being 1 and the passing state and the exposure condition B being 1 is set. When the highest reading success rate is less than a predetermined threshold value (for example, 60%), only the other switching state in which the reading success rate is equal to or higher than a predetermined threshold value may be selected, instead of selecting the switching state Then, the reading condition table is set so that the higher the reading success rate, the earlier the selection is made. In the example of the part (B) of FIG. 12, since the reading success rate is the same, for example, as illustrated in the part (C) of FIG. 12, the reading condition table can be set so that the polarization state is preferentially selected first.

By performing the above reading process based on the reading condition table in which the switching state and the exposure condition as shown in the part (C) of FIG. 12 are set as the switching frequency, for example, the flow is as shown in the timing chart shown in FIG. 10.

As another example, as illustrated in the part (A) of FIG. 13, when the reading success rate as a result of performing the reading test under four kinds of exposure conditions A to D for each of the polarized state and the passing state is obtained, the reading success rate under exposure condition C is the highest at 90% in the polarized state, and in the passing state, the reading success rate under exposure condition B is the highest at 60%. Therefore, as illustrated in the part (B) of FIG. 13, the switching frequency of the ratio of the polarized state and the exposure condition C being 3 and the passing state and the exposure condition B being 2 is set. Then, as illustrated in the part (C) of FIG. 13, the reading condition table is set so that the polarized state having a high reading success rate is preferentially selected first.

Figure 14:
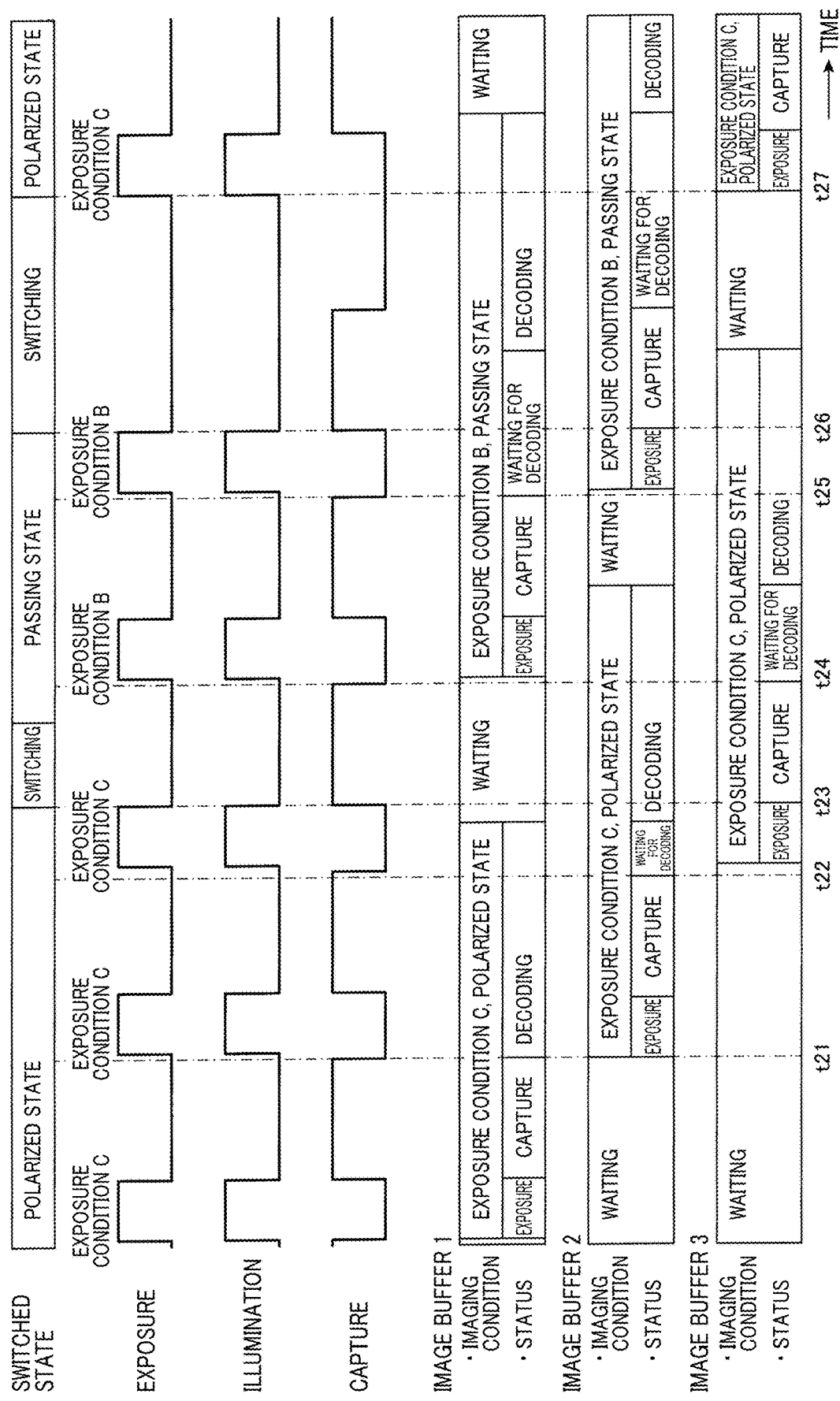
FIG. 14 is a timing chart for explaining a flow of a reading process when a switching frequency is set so that a process of capturing two captured images in a passing state is repeated after three captured images are captured in a polarized state.

Here, the flow of the reading process when the switching frequency and the like are set as described above will be specifically described with reference to the timing chart shown in FIG. 14. As shown in FIG. 14, the first exposure by the light receiving sensor 32 is started in a state where the polarization state is first set and the exposure condition (exposure condition C) suitable for the polarization state is set. After that, when this exposure is completed, the capture of the captured image from the light receiving sensor 32 for which the exposure is completed is started. Since switching is not required based on the reading condition table set as described above, switching is not started.

Then, when the captured image is stored in the image buffer 1 prepared in the storage unit 22 when the capture is completed (see t21 in FIG. 14), the decoding process is started for the stored captured image, and the second exposure under the polarization state and the exposure condition C is started. If the decoding process is not completed when the exposure is completed, the captured image is captured and stored in the image buffer 2 (see t22 in FIG. 14), and the third exposure under the polarization state and the exposure condition C is started during the decoding standby state.

After that, when this exposure is completed (see t23 in FIG. 14), switching from the polarized state to the passing state is started, and the capture of the captured image from the light receiving sensor 32 that has completed the exposure is started. Then, when the switching from the polarized state to the passing state is completed and the capture of the captured image is completed (see t24 in FIG. 14), the first exposure under the passing state and the exposure condition B is started. After that, when this exposure is completed, the capture of the captured image from the light receiving sensor 32 for which the exposure is completed is started. Since switching is not required based on the reading condition table set as described above, switching is not started.

Then, when the captured image is stored in the image buffer 1 prepared in the storage unit 22 after the capture is completed (see t25 in FIG. 14), the second exposure under the passing state and the exposure condition B is started. If the previous decoding process is not completed, the decoding standby state is set, and when the previous decoding process is completed, the decoding process is started for the captured image stored in the image buffer.

After that, when the second exposure is completed (see t26 in FIG. 14), the switching from the passing state to the polarized state is started, and the capture of the captured image from the light receiving sensor 32 that has completed the exposure is started. Then, when the switching from the passing state to the polarized state is completed and the capture of the captured image is completed (see t27 in FIG. 14), the first exposure under the polarized state and the exposure condition C is started.

As described above, in the optical information reader 10 according to the present embodiment, the switching frequency in the second polarizing unit 42 is set by the switching frequency setting process performed by the control unit 21 according to the decoded result in decoding processing for the captured image captured in the polarized state switched by the second polarizing unit 42 and the decoded result of decoding process for captured image captured in the passing state. The control unit 21 performs switching in the second polarizing unit 42 according to the set switching frequency.

As a result, even when an information code or the like for suppressing the influence of specular reflection or an information code formed on an uneven surface is mixed as a reading target, the switching frequency can be set according to the mixing situation. Therefore, the reading of the information code becomes easy to succeed, and the time related to the reading process can be shortened.

In particular, in the present embodiment, according to the comparison result between the decoded result of decoding process obtained every time the exposure condition is changed in the polarization state switched by the second polarization unit 42 and the decoded result of decoding process obtained every time the exposure condition is changed in the passing state, the switching frequency and the exposure condition in the second polarizing unit 42 are set by the switching frequency and the like setting processing performed by the control unit 21. As a result, the switching frequency can be set in consideration of the exposure conditions, so that the reading of the information code is facilitated to success, and the time related to the reading process can be further shortened.

In the second embodiment in which the first polarizing unit 41 functions as the switching polarizing unit, depending on the comparison result between the decoded result of decoding processing for the captured image captured from the light receiving sensor 32 in the first polarization state switched by the first polarization unit 41, and decoded result of decoding processing for the captured image captured from the light receiving sensor 32 in the second polarized state, the switching frequency, the exposure condition, and the like in the first polarizing unit 41 may be set.

Sixth Embodiment

Next, the optical information reader according to the sixth embodiment will be described with reference to the drawings. The sixth embodiment is mainly different from the first embodiment in that a configuration for suppressing a decrease in the amount of light due to polarization in the first polarizing unit is adopted. Therefore, the same components as those of the first embodiment are designated by the same reference numerals, and the description thereof will be omitted.

Figure 15:
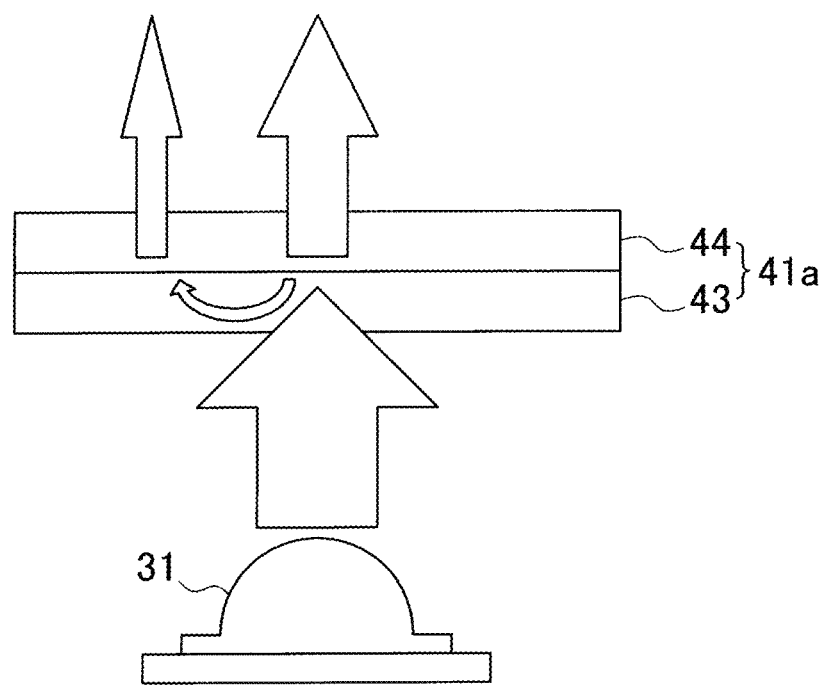
FIG. 15 is an explanatory diagram illustrating a first polarizing unit adopted in the optical information reader according to the sixth embodiment.

In the present embodiment, in order to suppress a decrease in the amount of light due to polarization in the first polarized light section, the first polarized light section 41a shown in FIG. 15 is adopted instead of the first polarized light section 41 described above. The first polarization unit 41a is configured to include a diffusion unit 43 that diffuses (scatters) the illumination light from the illumination unit 31 and a reflection polarization unit 44 in order to align most of the incident illumination light in the predetermined polarization direction and emit the light. The reflected polarized light unit 44 is, for example, a trade name "DBEF" manufactured by 3M Co., Ltd., and Of the light diffused by the diffusing unit 43 (randomly polarized light, unpolarized light), the light in the predetermined polarization direction (for example, S-polarized light) is transmitted, and the remaining light (for example, P-polarized light) is reflected toward the diffusing unit 43.

With this configuration, the illumination light incident on the first polarizing unit 41 from the illumination unit 31 is diffused by the diffusion unit 43, and of the diffused light, the light polarized in the predetermined polarization direction passes through the reflected polarization section 44, and the rest is diffused again by the diffusing section 43. That is, in the first polarizing unit 41a, diffusion and transmission/reflection are repeated so that most of the illumination light is aligned in the predetermined polarization direction.

As described above, in the optical information reader 10 according to the present embodiment. When the light reflected by the reflection polarization unit 44 is diffused again by the diffusion unit 43, a part of the light in the predetermined polarization direction is transmitted through the reflection polarization unit 44. Since the decrease in the amount of light due to polarization in the first polarizing unit 41a is suppressed, the amount of illumination light required for reading the information code can be easily secured.

As a configuration for aligning most of the incident illumination light in the predetermined polarization direction and emitting the light, not only the reflection polarization unit 44 is adopted, but another polarization configuration, for example, a "PG-PCS" manufactured by Colorlink Japan, Ltd. may be adopted.

Further, the characteristic configuration of this embodiment can be applied to other embodiments.

Seventh Embodiment

Next, the optical information reader according to the seventh embodiment will be described with reference to the drawings. In the seventh embodiment, mainly the arrangement configuration of the lighting unit and the first polarizing unit is different from that of the first embodiment. Therefore, the same components as those of the first embodiment are designated by the same reference numerals, and the description thereof will be omitted.

Figure 16:
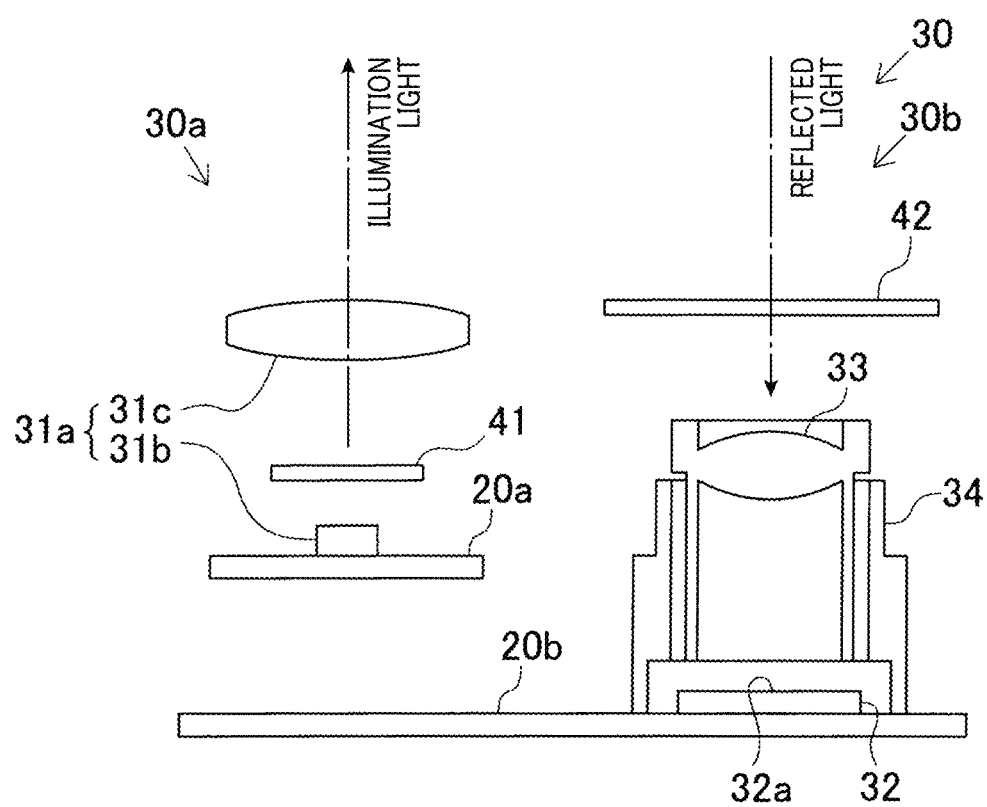
FIG. 16 is an explanatory diagram illustrating an arrangement relationship between a lighting unit and a first polarizing unit used in the optical information reader according to the seventh embodiment.

In the present embodiment, the illumination unit 31a shown in FIG. 16 is adopted instead of the illumination unit 31 described above. The illumination unit 31a includes a light source 31b such as an LED that emits illumination light and an illumination lens 31c as a condensing element that collects illumination light from the light source 31b, and the first polarizing unit 41 is arranged between the light source 31b and the illumination lens 31c. That is, the first polarizing unit 41 is arranged between the light source 31b and the illumination lens 31c. In particular, in the present embodiment, the first polarizing unit 41 is arranged between the light source 31b and the illumination lens 31c so as to be closer to the light source 31b than the illumination lens 31c.

The illumination light emitted from the light source 31b spreads as the distance from the light source 31b increases. Therefore, the area where the illumination light is incident on the first polarizing unit 41, that is, the area where the illumination light should be polarized by the first polarizing unit 41, becomes smaller, compared with the case where the first polarizing unit 41 is arranged on the light-exit side of the illumination lens 31c. Further, as compared with the case where the first polarizing unit 41 is arranged on the emission side of the illumination lens 31c, the light-collecting effect of the illumination lens 31c is enhanced, so that the amount of illumination light required for reading the information code can be easily secured since the illumination lens 31c can be moved away from the light source 31b.

The characteristic configuration of the present embodiment in which the first polarizing unit is arranged between the light source and the illumination lens (condensing element) can be applied to other embodiments. In particular, in the configuration in which the reflection polarizing unit or the like is adopted to improve the polarization efficiency as in the sixth embodiment, the light emitted from the first polarizing unit is easily diffused. Therefore, the illumination light radiated to the information code can be effectively condensed by arranging the first polarizing unit between the light source and the illumination lens.

Eighth Embodiment

Next, the optical information reader according to the eighth embodiment will be described with reference to the drawings. The eighth embodiment is mainly different from the first embodiment and the like in that the user is notified of the reading success rate when the information code is read by using the optical information reader configured as described above.

The optical information reader 10 according to the present embodiment is a stationary reading device. As shown in parts (A) and (B) of FIG. 17, a box-shaped case 11 constitutes an outer shell, and at least a part of the control unit 21 and the optical system 30 is housed inside the case 11. The display screen 24a of the display unit 24 is arranged at the center of the first surface 11a of the case 11, and a reading port 12 for taking in the reflected light from the information code C is arranged in the center of the second surface 11b connected to the first surface 11a.

A pair of light emitting units 25 are provided on the first surface 11a so as to face each other via the display screen 24a, and both light emitting units 25 are arranged so that they can be visually recognized even from the surface side where both the first surface 11a and the second surface 11b are connected to each other. In the present embodiment, both light emitting units 25 are controlled by the control unit 21 and are configured to be capable of emitting a plurality of colors such as blue, green, and red. Further, on the second surface 11b side of the display screen 24a on the first surface 11a, two push button type switches constituting the operation unit 23 are arranged.

A pair of illumination windows 13a and 13b are provided on the second surface 11b so as to face each other via the reading port 12. In the present embodiment, the illumination unit 31 is configured to irradiate the illumination light through the illumination window, and one or more illumination units 31 are installed for each of the illumination windows 13a and 13b. In particular, in the present embodiment, it is possible to individually control the irradiation state of the illumination light emitted through the illumination window 13a and the irradiation state of the illumination light emitted through the illumination window 13b, which is controlled by the control unit 21.

Further, in the present embodiment, a speaker that is controlled by the control unit 21 and emits various notification sounds such as preset sounds and alarm sounds is provided, and the sound emitting holes 14 of the speakers are arranged in the vicinity of the illumination window 13b.

Figure 18:
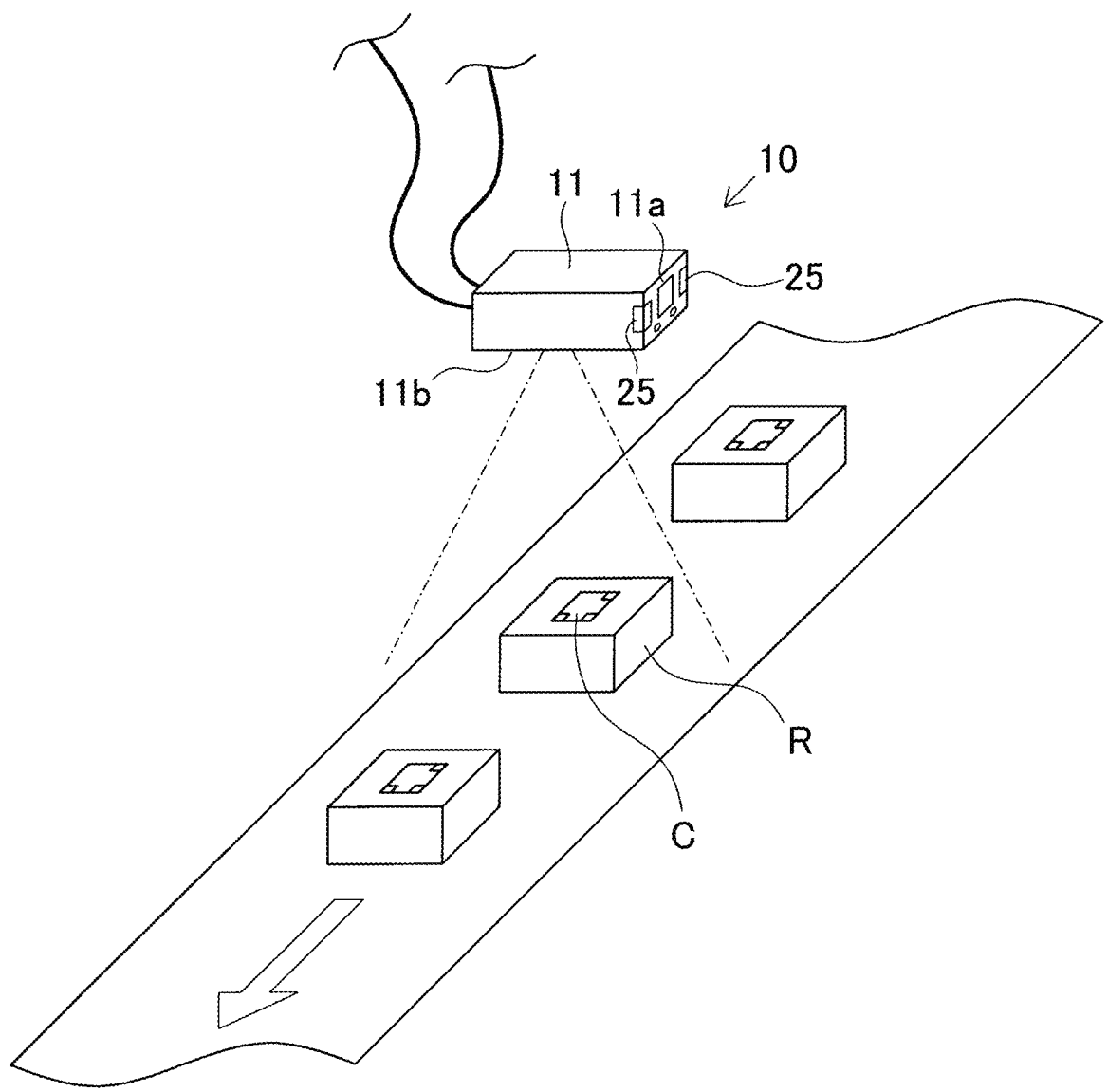
FIG. 18 is an explanatory diagram illustrating a state in which the optical information reader of FIG. 17 is installed on a conveyor line.

As shown in FIG. 18, the optical information reader 10 configured in this way is on a transport line on which the transport articles R to which the information code C is attached are sequentially transported, the second surface 11b is arranged so as to face the lower transport line and the first surface 11a faces the user side. Then, the reading result or the like obtained by the reading process of the captured information code C performed by the control unit 21 is transmitted to the higher-level device via the communication interface 26.

Next, the characteristic configuration of this embodiment will be described. In the present embodiment, the information code C formed by Direct Part Marking (DPM) using the uneven pattern provided on the display surface (printing surface) of the conveyed article R is read. In the information code C formed in this way, in order to secure a constant reading success rate, it is necessary to adjust various parameters such as exposure conditions, presence/absence of polarized light, presence/absence of specular reflection, and irradiation state by each illumination unit 31 according to the information code C. In addition, even if the initial setting is made to ensure a certain reading success rate, the reading success rate may gradually decrease without the user noticing due to changes in the information code due to changes in the environment during subsequent operations. A method of quantifying the reading success rate and displaying it on the display screen is conceivable, but the display screen may be difficult to see depending on the installation environment of the device.

Therefore, in the present embodiment, the user who receives this notification can easily recognize the level of the reading success rate in the current optical information reader 10 by performing notification according to the calculated reading success rate by the reading rate notification processing performed by the control unit 21. Here, the reading success rate can be calculated, for example, according to the number of successful readings when the reading process is repeated for a predetermined time for the same information code.

In particular, in the present embodiment, the light emitting state of the pair of light emitting units 25 is used to perform notification according to the reading success rate. Specifically, for example, if the reading success rate is High level (for example, 90% or more), both light emitting units 25 emit light in blue, and if the reading success rate is Lo level (for example, less than 90%), both light emitting units 25 emit light in red. Then, the user who sees the light emitting state of both light emitting units 25 can easily recognize the level of the reading success rate by the current optical information reader 10.

In this way, the level of the reading success rate can be easily recognized according to the light emitting state of the light emitting unit 25. Therefore, at the time of initial setting, various parameters such as exposure conditions, presence/absence of polarized light, presence/absence of specular reflection, and irradiation state by each illumination unit 31 can be easily adjusted to a state suitable for reading the information code C. Further, even during the operation after the initial setting, when the reading success rate decreases, the light emitting state of the light emitting unit 25 changes, so that the decrease in the reading success rate can be easily recognized.

In order to notify the reading success rate level in more detail, for example, if the reading success rate is High level (for example, 95% or more), both light emitting units 25 emit blue light, and if the reading success rate is Mid level (for example, 50% or more and less than 95%), both light emitting units 25 emit green light. Also, if the reading success rate is Lo (Low) level (for example, less than 50%), both light emitting units 25 may emit light in red. Further, as described above, the level of the three types of reading success rates is not limited to the notification of the three types of light emitting states, and the level of the four or more types of reading success rates may be notified in the four or more types of light emitting states (including the blinking state). Further, the above notification is not limited to the light emitting state of the pair of light emitting units 25, and the above notification may be performed by using the light emitting state of another light emitting unit provided in the case 11. Moreover, in the state where the reading success rate is calculated, both light emitting units 25 may be in the non-light emitting state, and when the reading success rate is Lo level, the non-light emitting state may be obtained.

Further, the relationship between the level of the reading success rate and the light emitting state of the light emitting unit 25 may be displayed on the display screen 24a of the display unit 24, the display screen of the higher-level device, or the like. At that time, if the display screen is color, the above relationship can be shown by the displayed color, and if the display screen is monochrome, the above relationship can be shown by the displayed characters.

Further, the level of the reading success rate may be notified according to the interval of the beep sounds intermittently emitted through the sound emitting holes 14 by the speaker functioning as a buzzer. Further, the frequency of the beep sound may be changed according to the level of the reading success rate. For example, as the reading success rate level becomes higher, the reading success rate level may be notified by shortening the frequency of the beep sound (increasing the sound). In addition, the level of the reading success rate and the specific numerical value of the reading success rate may be notified by voice.

Further, the relationship between the level of the reading success rate and the light emitting state of the light emitting unit 25 may be changeable according to a predetermined operation by the user, reading of an information code for setting, or the like. Similarly, the relationship between the reading success rate level and the beep sound or the like may be changeable according to a predetermined operation by the user, reading of an information code for setting, or the like.

The characteristic configuration of the present embodiment for notifying the level of the reading success rate can be applied to other embodiments and the like.

Ninth Embodiment

Next, the optical information reader according to the ninth embodiment will be described with reference to the drawings. The ninth embodiment is mainly different from the first embodiment and the like in that the second polarizing unit is arranged between the imaging lens configured as the wide-angle lens and the light receiving sensor.

Figure 19:
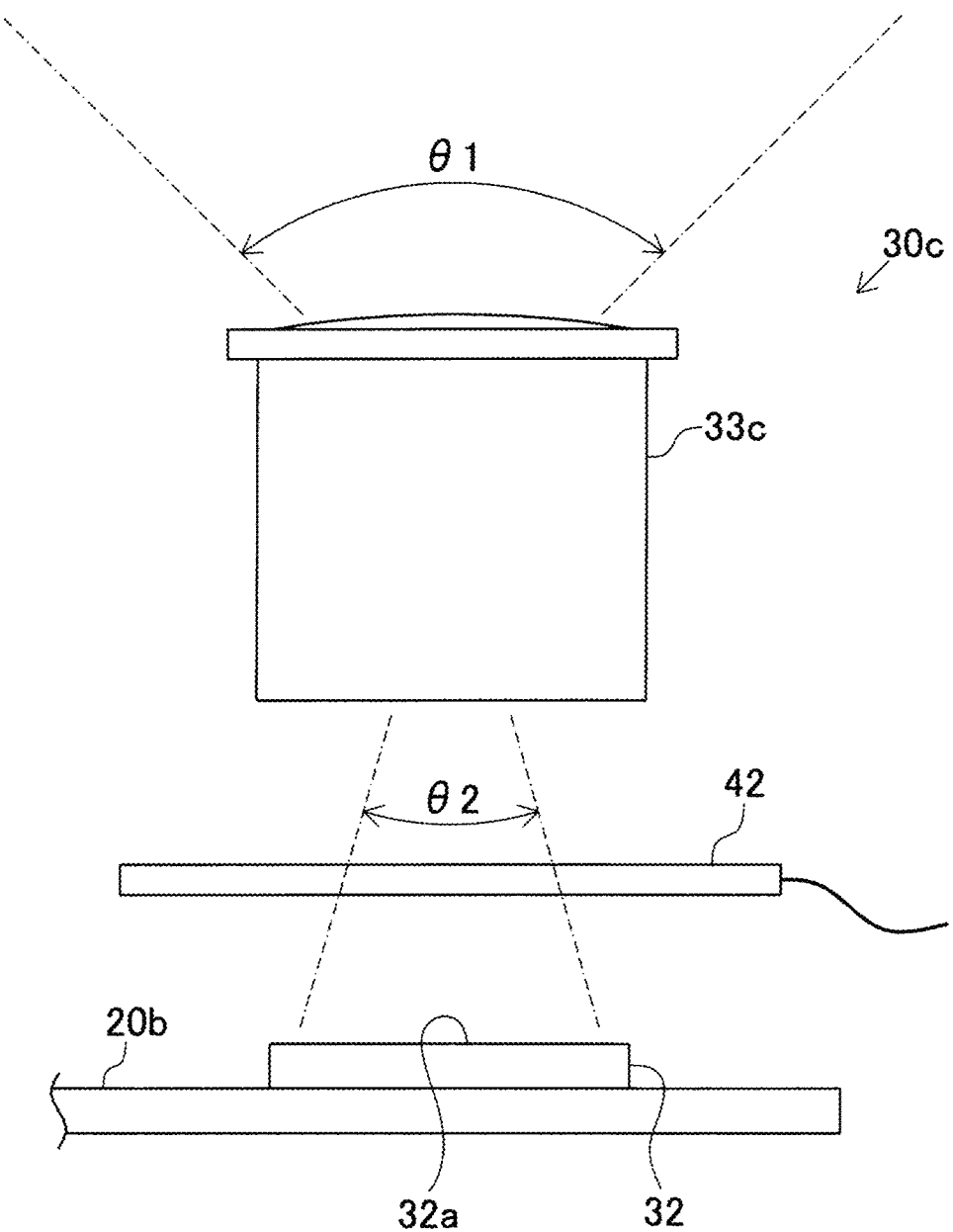
FIG. 19 is an explanatory diagram schematically illustrating a configuration of a light receiving optical system of the optical information reader according to the ninth embodiment.

In this embodiment, the light receiving optical system 30c shown in FIG. 19 is adopted instead of the light receiving optical system 30b. The light receiving optical system 30c is configured to include an imaging lens 33c instead of the imaging lens 33 with respect to the light receiving optical system 30b.

In order to widen the imaging range, as shown in FIG. 19, the imaging lens 33c is formed as a lens in which the maximum angle θ1 of the incident light rays formed on the light receiving sensor 32 is larger than the maximum angle θ2 of the emitted light rays formed on the light receiving sensor 32.

When the second polarizing unit 42 functioning as the switching polarizing unit is arranged on the incident side of the imaging lens 33c, the angle of a light beam incident on the switching polarizing unit becomes larger. Therefore, for example, when the liquid crystal member 50 or the like described is used as the switching polarizing unit, the specular reflection reduction effect in the peripheral portion of the imaging range is weakened.

Therefore, in the present embodiment, as shown in FIG. 19, the light receiving optical system 30c is configured such that the second polarizing unit 42 is arranged between the light receiving sensor 32 and the imaging lens 33c. As a result, the angle of a light beam incident on the switching polarizing unit is smaller than that in the case where the second polarizing unit 42 is arranged on the incident side (i.e., the upper side in FIG. 19) of the imaging lens 33c, so that even when a wide-angle lens for widening the angle of view is used as the imaging lens 33c, the specular reflection reduction effect can be obtained over the entire imaging range.

The present disclosure is not always limited to each of the foregoing embodiments, but may be embodied in other forms, which are as follows, for example.

(1) In the first embodiment or the like, the second polarizing unit 42 is not always limited to being configured by the liquid crystal member 50 and the polarizing plate 60, but may be configured to adopt another switching polarizing unit that can switch between a polarized state in which the reflected light is polarized in a direction different from that of the first polarizing unit 41 and a passing state in which reflected light passes through without being polarized.

(2) In the second embodiment or the like, the first polarizing unit 41 is not always limited to being configured by the liquid crystal member 50 and the polarizing plate 60, but may be configured to have another switching polarizing unit that can switch between the first polarization state in which the illumination light is polarized in the first polarization direction and the second polarization state in which the illumination light is polarized in the second polarization direction.

(3) The present disclosure is not always limited to being applied to an optical information reader 10 having an optical information reading function for reading optical information such as an information code and character information. The present disclosure may also be applied to an optical information reader having another function, for example, a wireless tag communication function for reading/writing information from/to a wireless tag. Further, the present disclosure may also be applied to a portable optical information reader or a stationary optical information reader.

DESCRIPTION OF PARTIAL REFERENCE SIGNS

10 . . . optical information reader
21 . . . control unit (reading unit, detecting unit, setting unit)
30 . . . optical system
31,31a . . . lighting unit
32 . . . light receiving sensor (light receiving unit)
41,41a . . . first polarizing unit
42 . . . second polarizing unit
50 . . . liquid crystal member
51 . . . liquid crystal layer
52,52b . . . alignment film 54 ... spacer
60 ... polarizing plate
C ... information code

What is claimed is:

1. An optical information reader, comprising:
a lighting unit configured to emit illumination light to an information code;
a first polarizing unit arranged on a light-exit side of the illumination unit;
a light receiving unit configured to receive light reflected from the information code;
a second polarizing unit arranged on a light-reception side of the light receiving unit; and
a reading unit configured to read the information code based on light reception results at the light receiving unit, wherein
the first polarizing unit is configured to polarize the illumination light in a predetermined polarization direction, and
the second polarizing unit is configured as a switchable polarizing unit which is switchable to either one of a state where the reflected light is polarized in a direction different from the predetermined polarization direction and a state where the reflected light passes through the second polarizing unit without being polarized.

2. The optical information reader of claim 1, wherein the first polarizing unit is provided with a diffusion unit which diffuses the illumination light and a reflection polarizing unit which, of light diffused by the diffusion unit, allows i) light in the predetermined polarization direction to pass therethrough and ii) remaining light which is other than the light in the predetermined polarization direction to be reflected towards the diffusion unit.

3. The optical information reader of claim 1, wherein
the light receiving unit is provided with a light receiving sensor and an imaging lens which forms an image on a light receiving surface of the light receiving sensor;
the imaging lens is formed to enable a maximum angle of incident light rays imaged on the light receiving sensor to be larger than a maximum angle of emitted light rays imaged on the light receiving sensor; and
the second polarizing unit is arranged between the imaging lens and the light receiving sensor.

4. An optical information reader, comprising:
a lighting unit configured to emit illumination light to an information code;
a first polarizing unit arranged on a light-exit side of the illumination unit;
a light receiving unit configured to receive light reflected from the information code;
a second polarizing unit arranged on a light-reception side of the light receiving unit; and
a reading unit configured to read the information code based on light reception results at the light receiving unit, wherein
the first polarizing unit is configured to as a switchable polarizing unit which is switchable to either one of a state where the illumination light is polarized in a first polarization direction and a state where the illumination light is polarized in a second polarization direction, and
the second polarizing unit is configured to polarize the reflection light to the second polarization direction.

5. The optical information reader of claim 1, wherein the switchable polarizing unit is configured to include a liquid crystal member and a polarizing plate.

6. The optical information reader of claim 5, wherein
the liquid crystal member is provided with a liquid crystal layer and a pair of one pair of alignment films opposed to each other via the liquid crystal layer and configured to have rubbing directions which are mutually different by 90 degrees, and
the alignment films are arrange such that the rubbing directions thereof are oblique to one of outer edges of the light receive surface of the light receiving unit.

7. The optical information reader of claim 5, wherein
the liquid crystal member is provided with a liquid crystal layer containing a spacer,
the liquid crystal layer is formed such that a content rate of the spacer in a region acting as a light receiving range of the light receiving unit is lower than a content rate of the spacer in a region which is different from the light receiving range.

8. The optical information reader of claim 1, wherein
the optical information reader comprises
a control unit configured to control switching operations of the switchable polarizing unit; and
a detecting unit configured to detect completion of the switching operations of the switchable polarizing unit,
wherein the light receiving unit is configured to start exposure thereof depending on results detected by the detecting unit, after completion of the switching operations of the switchable polarizing unit.

9. The optical information reader of claim 8, wherein
the optical information reader comprises a storage unit into which data of the images captured from the light receiving unit are stored in sequence,
wherein the reading unit is configured to perform a decoding process for decoding and reading the information code from the captured images, every time the captured images are stored in the storage unit.

10. The optical information reader of claim 8, wherein
the control unit is configured to perform a switchover between the polarization states of the switchable polarizing unit according to a predetermined switching frequency.

11. The optical information reader of claim 8, wherein
the optical information reader comprises a setting unit configured to set the switching frequency for the switchable polarizing unit based on results of comparison made between i) decoded results of the reading unit related to the images captured from the light receiving unit in one of the polarization states switched over by the switchable polarizing unit and ii) decoded results of the reading unit related to the images captured from the light receiving unit in the other of the polarization states switched over by the switchable polarizing unit,
wherein the control unit is configured to perform the switchover in the switchable polarizing unit according to the switching frequency which has been set by the setting unit.

12. The optical information reader of claim 11, wherein
the setting unit is configured to set the switching frequency at the switchable polarizing unit and exposure conditions for the light receiving unit, according to results of comparison made between i) results decoded by the reading unit which are obtained every time the exposure conditions are changed in one of the polarization states at the switchable polarization unit and ii) results decoded by the reading unit which are obtained every time the exposure conditions are changed in the other of the polarization states at the switchable polarization unit.

13. The optical information reader of claim 1, wherein
the illumination unit comprises a light source which emits the illumination light and a condensing element which condenses the illumination light emitted by the light source, and
the first polarizing unit is arranged between the light source and the condensing element.

14. The optical information reader of claim 2, wherein
the light receiving unit is provided with a light receiving sensor and an imaging lens which forms an image on a light receiving surface of the light receiving sensor;
the imaging lens is formed to enable a maximum angle of incident light rays imaged on the light receiving sensor to be larger than a maximum angle of emitted light rays imaged on the light receiving sensor; and
the second polarizing unit is arranged between the imaging lens and the light receiving sensor.

15. The optical information reader of claim 4, wherein the switchable polarizing unit is configured to include a liquid crystal member and a polarizing plate.

16. The optical information reader of claim 15, wherein
the liquid crystal member is provided with a liquid crystal layer and a pair of one pair of alignment films opposed to each other via the liquid crystal layer and configured to have rubbing directions which are mutually different by 90 degrees, and
the alignment films are arrange such that the rubbing directions thereof are oblique to one of outer edges of the light receive surface of the light receiving unit.

17. The optical information reader of claim 16, wherein
the liquid crystal member is provided with a liquid crystal layer containing a spacer,
the liquid crystal layer is formed such that a content rate of the spacer in a region acting as a light receiving range of the light receiving unit is lower than a content rate of the spacer in a region which is different from the light receiving range.

18. The optical information reader of claim 4, wherein
the optical information reader comprises
a control unit configured to control switching operations of the switchable polarizing unit; and
a detecting unit configured to detect completion of the switching operations of the switchable polarizing unit,
wherein the light receiving unit is configured to start exposure thereof depending on results detected by the detecting unit, after completion of the switching operations of the switchable polarizing unit.

19. The optical information reader of claim 18, wherein
the optical information reader comprises a storage unit into which data of the images captured from the light receiving unit are stored in sequence,
wherein the reading unit is configured to perform a decoding process for decoding and reading the information code from the captured images, every time the captured images are stored in the storage unit.

20. The optical information reader of claim 4, wherein
the illumination unit comprises a light source which emits the illumination light and a condensing element which condenses the illumination light emitted by the light source, and
the first polarizing unit is arranged between the light source and the condensing element.

* * * * *